(12) United States Patent
Suwabe

(10) Patent No.: US 8,711,398 B2
(45) Date of Patent: Apr. 29, 2014

(54) IMAGE PROCESSING SYSTEM, IMAGE PROCESSING APPARATUS, CONTROL METHOD FOR IMAGE PROCESSING APPARATUS, AND STORAGE MEDIUM

(75) Inventor: Takeshi Suwabe, Tokyo (JP)

(73) Assignee: Canon Kabushiki Kaisha (JP)

( * ) Notice: Subject to any disclaimer, the term of this patent is extended or adjusted under 35 U.S.C. 154(b) by 393 days.

(21) Appl. No.: 12/652,263

(22) Filed: Jan. 5, 2010

(65) Prior Publication Data

US 2010/0171984 A1 Jul. 8, 2010

(30) Foreign Application Priority Data

Jan. 7, 2009 (JP) ................................. 2009-001856

(51) Int. Cl.
*G06F 15/00* (2006.01)

(52) U.S. Cl.
USPC ........ 358/1.15; 358/1.13; 358/1.14; 709/221; 709/201

(58) Field of Classification Search
None
See application file for complete search history.

(56) References Cited

U.S. PATENT DOCUMENTS

| | | | |
|---|---|---|---|
| 6,184,998 B1 * | 2/2001 | Tebeka | 358/1.15 |
| 6,876,469 B1 * | 4/2005 | Nakamura | 358/437 |
| 7,016,740 B2 * | 3/2006 | Nakamura et al. | 700/19 |
| 7,800,769 B2 * | 9/2010 | Kobayashi et al. | 358/1.13 |
| 7,940,744 B2 * | 5/2011 | Lehotsky et al. | 370/351 |
| 8,190,719 B2 * | 5/2012 | Furukawa | 709/221 |
| 2003/0112456 A1 * | 6/2003 | Tomita et al. | 358/1.13 |
| 2005/0060649 A1 * | 3/2005 | Kimura et al. | 715/526 |
| 2007/0087778 A1 * | 4/2007 | Otsuka | 455/550.1 |

FOREIGN PATENT DOCUMENTS

| | | |
|---|---|---|
| JP | 11-175272 A | 7/1999 |
| JP | 2004160950 A | 6/2004 |
| JP | 2006-088471 A | 4/2006 |
| JP | 2008-250973 A | 10/2008 |

OTHER PUBLICATIONS

Office Action issued Feb. 22, 2012 for corresponding CN201010000094.4 (English translation provided).
Japanese Office Action issued in corresponding Japanese Patent Application 2009-001856 dated Dec. 4, 2012.

* cited by examiner

*Primary Examiner* — Ashish K Thomas
(74) *Attorney, Agent, or Firm* — Rossi, Kimms & McDowell LLP

(57) ABSTRACT

An image processing system which can distribute suitable distribution values to an apparatus that has newly joined the system. Device information on a plurality of already-connected image processing apparatuses among a plurality of image processing apparatuses connected together for communication with each other is obtained. Device information on a newly-connected image processing apparatus among the plurality of image processing apparatuses is obtained. An image processing apparatus that is to distribute common distribution values to the newly-connected image processing apparatus among the already-connected plurality of image processing apparatuses is determined based on the obtained device information.

12 Claims, 30 Drawing Sheets

```
<?xml version="1.0" encoding="UTF-8"?>
<ACT xmlns:xsi="http://www.w3.org/2001/XMLSchema-instance">
    <Devicetype>
        MFP
    </Devicetype>
    <Function>
        Copy
        Box
        Send
        Print
        NetworkScan
        FaxServer
    </Function>
    <Option>
        Finisher
        Deck
    </Option>
```

301 — Devicetype block
302 — Function block
303 — Option block

FIG. 5

| | | |
|---|---|---|
| 701 | IP ADDRESS | 172.22.11.123 |
| 702 | SUBNET MASK | 255.255.255.0 |
| 703 | GATEWAY | 172.22.11.11 |
| 704 | SERVER ADDRESS | 172.22.11.234 |

NETWORK SETTINGS

712 {
- ○ COMMON DISTRIBUTION VALUES
- \* MODE SETTINGS
- \*\* COMMON SPECIFICATION SETTINGS
- \*\*\* ON/OFF OF BEEPER
  - INPUT SOUND
  - REFILL ALARM SOUND
  - ALARM SOUND
  - JOB COMPLETED ALARM SOUND
- \*\*\* TIMER SETTINGS
  - DAY/TIME SETTING
  - AUTO SLEEP TIME

711 {

713 {
- \*\* SEND SPECIFICATION SETTINGS/SEND FUNCTION SETTINGS (COMMON SETTINGS)
  - ERROR DOCUMENT CLEAR SETTING
  - PRINTING PAPER PHOTO MODE ON/OFF SETTING
  - RETRY COUNT SETTING
  - ROUTINE TASK BUTTON REGISTRATION SETTING
  - SETTING FOR CONFIRMING DISPLAY AT CALL OF ROUTINE TASK BUTTON
  - SENDING SCREEN INITIAL REPRESENTATION SETTING
  - SOURCE LOGGING SETTING
  - INITIALIZATION OF SEND FUNCTION SETTINGS
- \*\* SENDING SPECIFICATION SETTINGS/BASIC SETTINGS (FAX SETTINGS)
  - ADDRESSER NAME SETTING
- \*\* REPORT OUTPUT
  - SEND RESULT REPORT SETTINGS
  - FAX SEND RESULT REPORT SETTINGS
  - COMMUNICATION MANAGEMENT REPORT SETTINGS
  - FAX COMMUNICATION MANAGEMENT REPORT SETTINGS
  - ADDRESS LIST PRINT SETTINGS
  - SEND USER DATA LIST PRINT SETTINGS
  - FAX USER DATA LIST PRINT SETTINGS

FIG. 7

```xml
<?xml version="1.0" encoding="UTF-8"?>
<ACT xmlns:xsi="http://www.w3.org/2001/XMLSchema-instance">
  <CommonSettings>
    <BasicSettings>
      <Beap>
        <Input>1</Input>
        <RefillAlarm>0</RefillAlarm>
        <Alarm>1</Alarm>
        <JobCompletedAlarm>1</JobCompletedAlarm>
      </Beap>
      <Timer>
        <DayTime>200806211212JST</Input>
        <SleepIn>60</SleepIn>
      </Timer>
    <BasicSettings>
    <SendSettings>
      <ClearErrorDocument>1</ClearErrorDocument>
      <ImagePhoto>0</ImagePhoto>
      <RetryCount>5</RetryCount>
      <RoutineTask>1</RoutineTask>
      <ConfirmRoutineTask>0</ConfirmRoutineTask>
      <SendPresentationInitialSettings>OneTouch<SendPresentationInitialSettings>
      <SourceLogging>1<SourceLogging>
      <Format>0<Format>
    </SendSettings>
    <AddressSettings>
      <AddresserName>CanonSuzuki<AddresserName>
    </AddressSettings>
    <ReportSettings>
      <SendResultReportSettings>1<SendResultReportSettings>
      <TransmittingResuletReportSettinds>1<TransmittingResuletReportSettinds>
      <FaxSendResultReportSettings>1<FaxSendResultReportSettings>
      <FaxTransmittingResuletReportSettinds>1<FaxTransmittingResuletReportSettinds>
      <PrintAddListPrintSettings>1<PrintAddListPrintSettings>
      <SendUserDataListPrintSettings>1<SendUserDataListPrintSettings>
      <FAXUserDataListPrintSettings>1<FAXUserDataListPrintSettings>
    </ReportSettings>
    <AddressBookSettings>0<AddressBookSettings>
    <SystemSettings>
      <AddressBookPassword>xxxx<AddressBookPassword>
      <AddressBookAccessNumber>1<AddressBookAccessNumber>
      <ConfirmInputFAXNumber>0<ConfirmInputFAXNumber>
    </SystemSettings>
    <LDAPServer>ldap.xxx.com<LDAPServer>
  </CommonSettings>
  <UniqueSettings>
    <Settings>
      <SystemSettings>
        <LineNumber>5<LineNumber>
        <AbbreviatedUserName/>33-OA5<AbbreviatedUserName/>
      </SystemSettings>
    </Settings>
  </UniqueSettings>
```

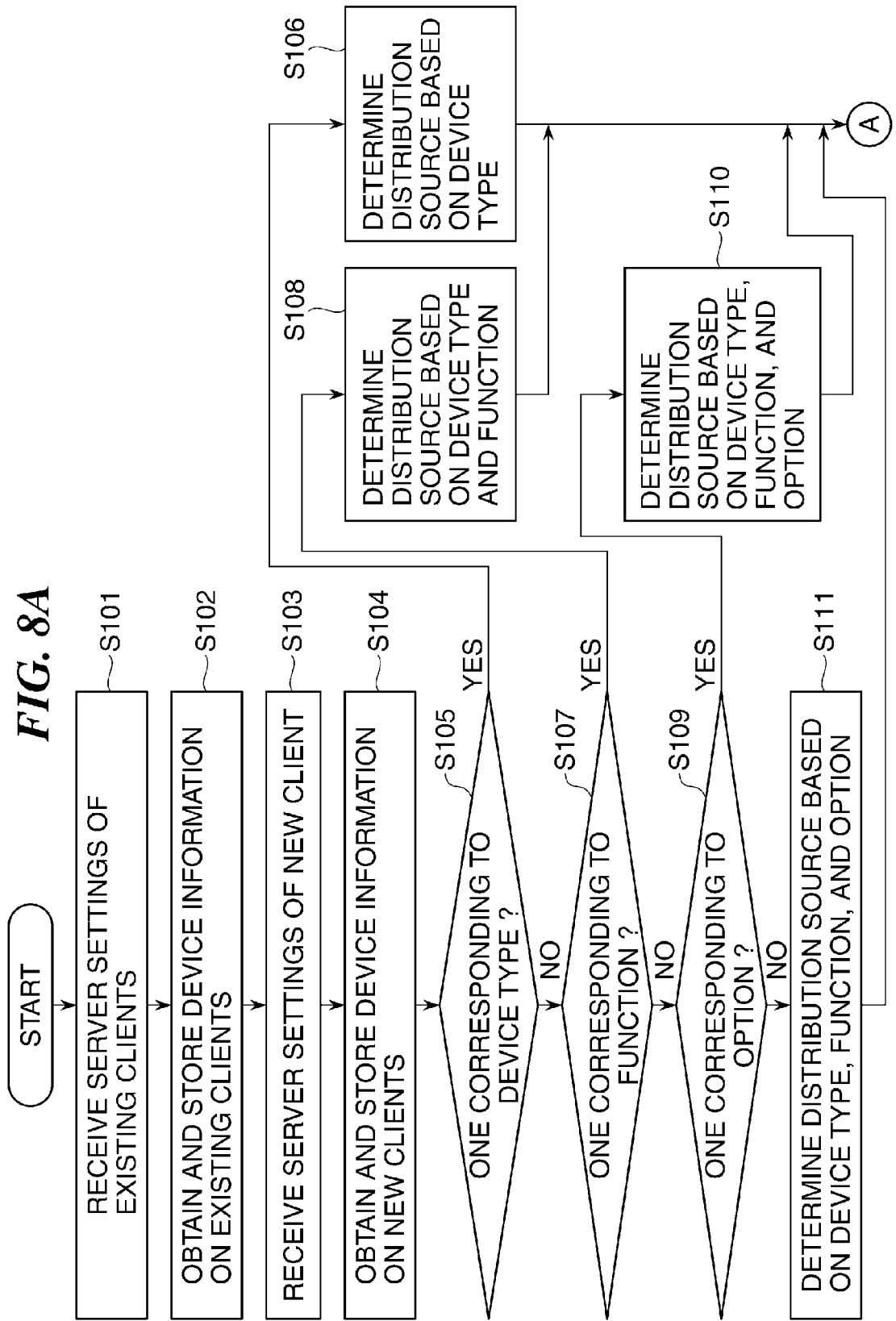

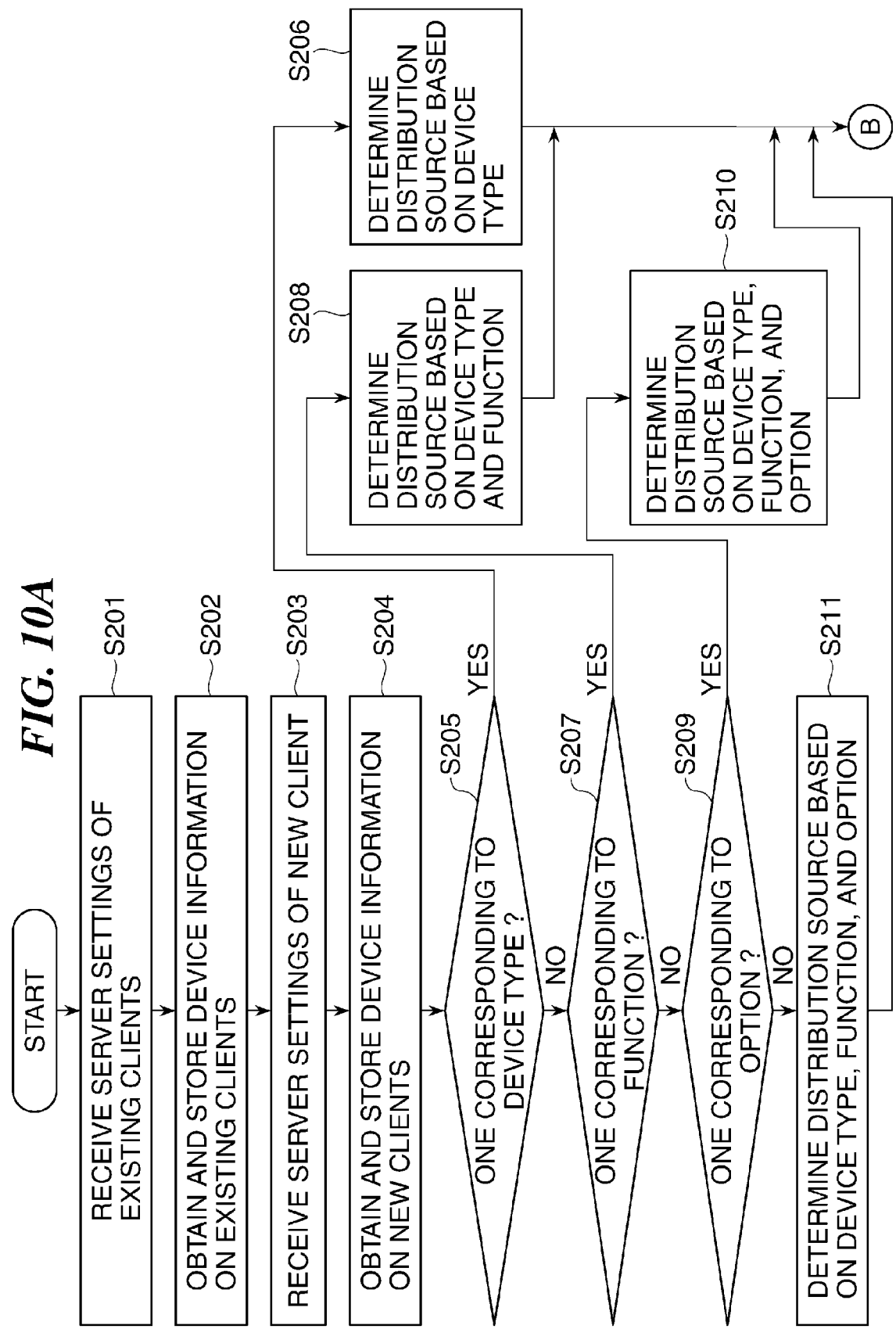

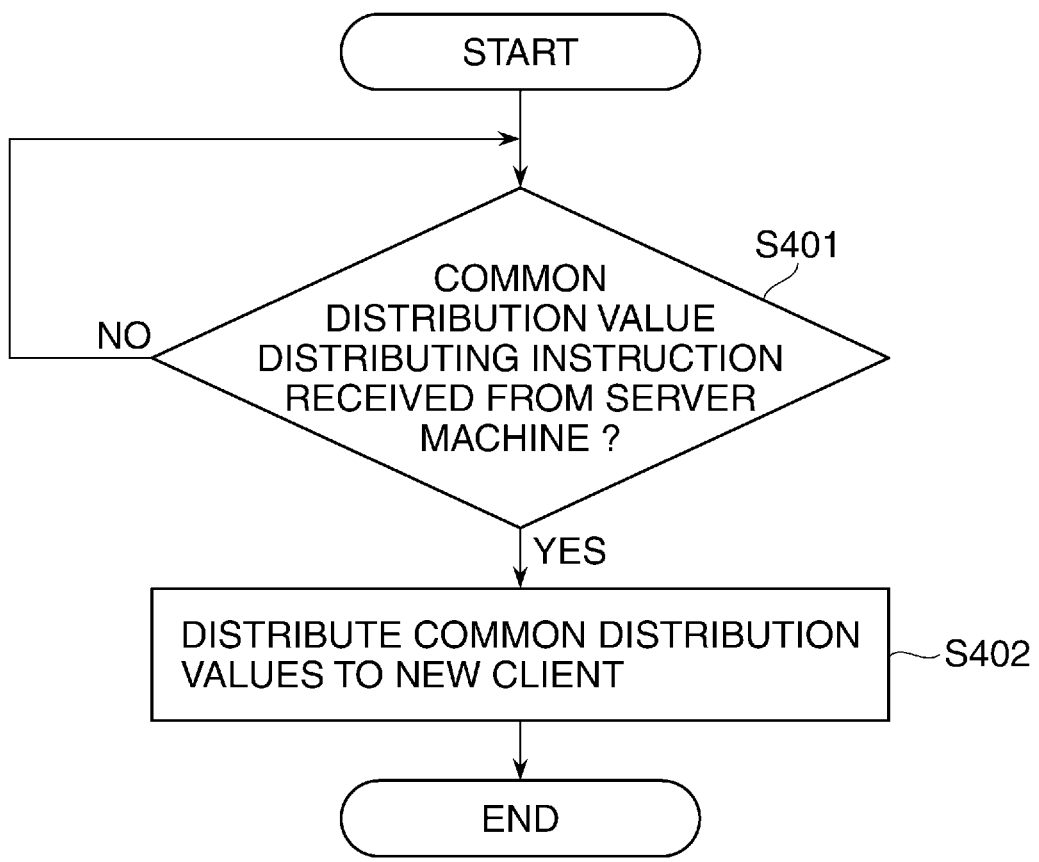

FIG. 13

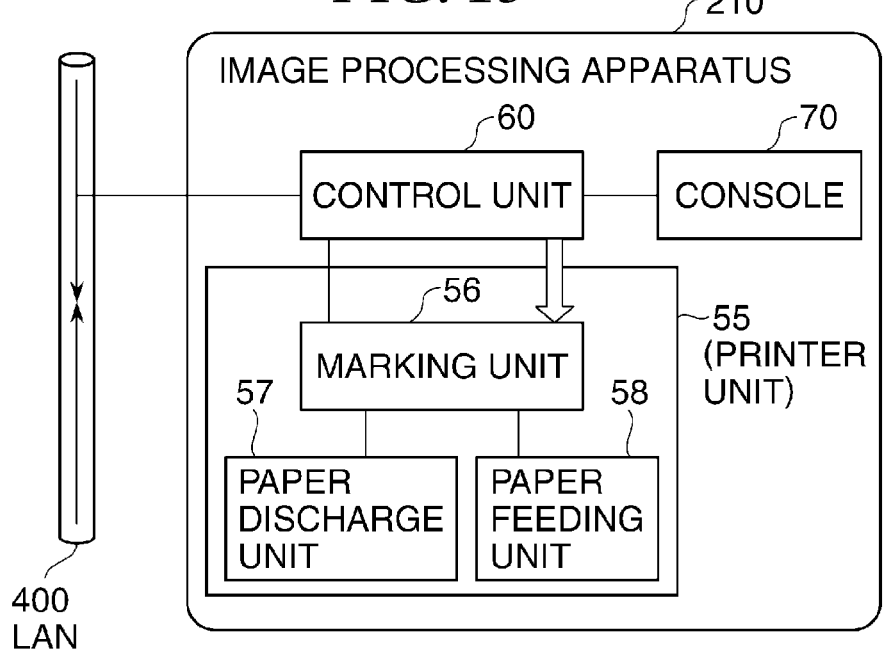

FIG. 14

```
      ○  COMMON DISTRIBUTION VALUES
      *    MODE SETTINGS
      **   COMMON SPECIFICATION SETTINGS
      *** ON/OFF OF BEEPER
           INPUT SOUND
  712      REFILL ALARM SOUND
           ALARM SOUND
           JOB COMPLETED ALARM SOUND
      *** TIMER SETTINGS
711        DAY/TIME SETTING
           AUTO SLEEP TIME
      **   REPORT OUTPUT
           COMMUNICATION MANAGEMENT REPORT
           SETTINGS
           FAX COMMUNICATION MANAGEMENT REPORT
  713      SETTINGS
           ADDRESS LIST PRINT SETTINGS
           SEND USER DATA LIST PRINT SETTINGS
           FAX USER DATA LIST PRINT SETTINGS

○  UNIQUE DISTRIBUTION VALUES
  714 *    LINE NUMBER SETTING
      *    ABBREVIATED USER NAME
```

FIG. 16

```
        ⎧  ⎧  O   COMMON DISTRIBUTION VALUES
        ⎪  ⎪  *   MODE SETTINGS
        ⎪  ⎪  **  COMMON SPECIFICATION SETTINGS
        ⎪  ⎪  *** ON/OFF OF BEEPER
        ⎪  ⎪      INPUT SOUND
     712⎨      REFILL ALARM SOUND
        ⎪      ALARM SOUND
        ⎪      JOB COMPLETED ALARM SOUND
        ⎪  *** TIMER SETTINGS
        ⎪      DAY/TIME SETTING
        ⎩      AUTO SLEEP TIME
711⎨       **  USER BOX SETTINGS/REGISTRATION
           BOX SELECTION
           BOX NAME REGISTRATION
           PASSWORD DOCUMENT AUTOMATIC DELETION
           URL SEND SETTING
           PRINT AT STORAGE FROM PRINTER DRIVER
           INITIALIZATION
     713⎨ ** PRINTING PAPER PHOTO MODE
        ** SCANNING-IN SETTING STANDARD MODE

** USB MEMORY SETTINGS
           SCANNING-IN SETTING STANDARD MODE
           CONFIRMING REPRESENTATION AT INSERTION OF
           USB MEMORY
```

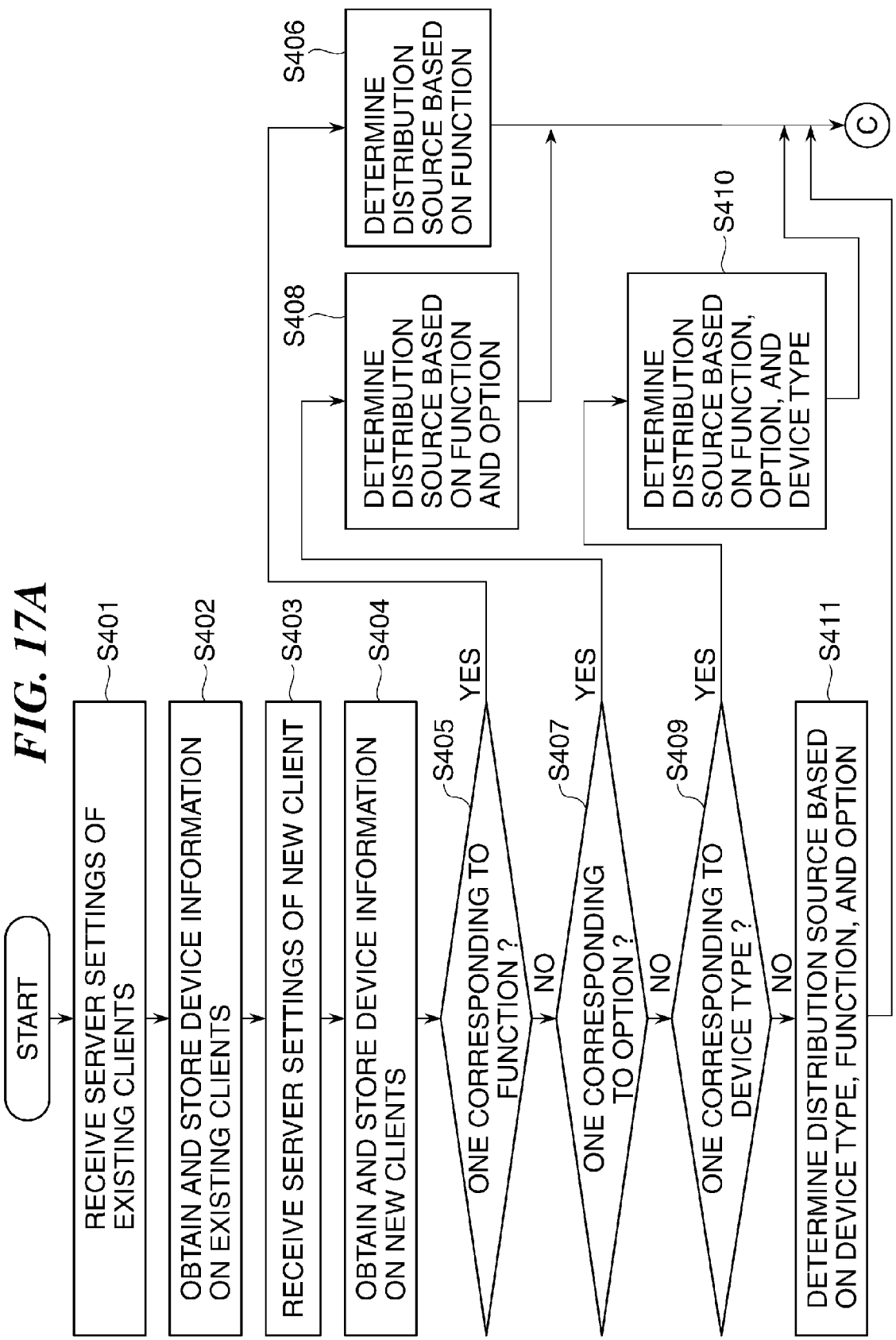

FIG. 20A

```
       ┌ ┌  ○   COMMON DISTRIBUTION VALUES
       │ │  *   MODE SETTINGS
       │ │  **  COMMON SPECIFICATION SETTINGS
       │ │  *** ON/OFF OF BEEPER
       │ │      INPUT SOUND
     712│      REFILL ALARM SOUND
       │ │      ALARM SOUND
       │ │      JOB COMPLETED ALARM SOUND
       │ │  *** TIMER SETTINGS
       │ │      DAY/TIME SETTING
       │ └      AUTO SLEEP TIME
       │   **  DISCHARGE TRAY SETTINGS
       │       TRAY A
       │       TRAY B
    711        TRAY C
       │   **  COPY SPECIFICATION SETTINGS
       │       AUTOMATIC SORT
       │       MIXED LOADING OF PAPER ON DISCHARGE TRAY
       │ ┌ **  SEND SPECIFICATION SETTINGS/SEND FUNCTION
       │ │      SETTINGS (COMMON SETTINGS)
     713       ERROR DOCUMENT CLEAR SETTING
       │ │      PRINTING PAPER PHOTO MODE ON/OFF SETTING
       │ │      RETRY COUNT SETTING
       │ │      ROUTINE TASK BUTTON REGISTRATION SETTING
       │ │      SETTING FOR CONFIRMING DISPLAY AT CALL OF
       │ │      ROUTINE TASK BUTTON
       │ │      SENDING SCREEN INITIAL REPRESENTATION
       │ │      SETTING
       │ │      SOURCE LOGGING SETTING
       └ └      INITIALIZATION OF SEND FUNCTION SETTINGS
```

FIG. 20B

711 { 713 {
** SENDING SPECIFICATION SETTINGS/BASIC SETTINGS (FAX SETTINGS)
ADDRESSER NAME SETTING
** REPORT OUTPUT
SEND RESULT REPORT SETTINGS
FAX SEND RESULT REPORT SETTINGS
COMMUNICATION MANAGEMENT REPORT SETTINGS
FAX COMMUNICATION MANAGEMENT REPORT SETTINGS
ADDRESS LIST PRINT SETTINGS
SEND USER DATA LIST PRINT SETTINGS
FAX USER DATA LIST PRINT SETTINGS
** ADDRESS SPECIFICATION SETTINGS
** SYSTEM ADMINISTRATOR SETTINGS/ SEND FUNCTION RESTRICTION SETTINGS
ADDRESS BOOK PASSWORD SETTING
ADDRESS BOOK ACCESS NUMBER SETTING
NEW ADDRESS RESTRICTION SETTING
CONFIRMING INPUT SETTING AT INPUT OF FAX NUMBER
** SYSTEM ADMINISTRATOR SETTINGS/LDAP SERVER REGISTRATION

714 {
○ UNIQUE DISTRIBUTION VALUES
* LINE NUMBER SETTING
* ABBREVIATED USER NAME

FIG. 23A

```
○   COMMON DISTRIBUTION VALUES
*   MODE SETTINGS
**  COMMON SPECIFICATION SETTINGS
*** ON/OFF OF BEEPER
    INPUT SOUND
    REFILL ALARM SOUND
    ALARM SOUND
    JOB COMPLETED ALARM SOUND
*** TIMER SETTINGS
    DAY/TIME SETTING
    AUTO SLEEP TIME
**  SEND SPECIFICATION SETTINGS/SEND
    FUNCTION SETTINGS (COMMON SETTINGS)
    ERROR DOCUMENT CLEAR SETTING
    PRINTING PAPER PHOTO MODE ON/OFF
    SETTING
    RETRY COUNT SETTING
    ROUTINE TASK BUTTON REGISTRATION
    SETTING
    SETTING FOR CONFIRMING DISPLAY AT
    CALL OF ROUTINE TASK BUTTON
    SENDING SCREEN INITIAL REPRESENTATION
    SETTING
    SOURCE LOGGING SETTING
    INITIALIZATION OF SEND FUNCTION
    SETTINGS
**  SENDING SPECIFICATION SETTINGS/BASIC
    SETTINGS (FAX SETTINGS)
    ADDRESSER NAME SETTING
**  REPORT OUTPUT
    SEND RESULT REPORT SETTINGS
    FAX SEND RESULT REPORT SETTINGS
    COMMUNICATION MANAGEMENT REPORT
    SETTINGS
    FAX COMMUNICATION MANAGEMENT
    REPORT SETTINGS
```

Brackets: 711 encompasses the full list; 712 covers the upper portion (through TIMER SETTINGS area); 713 covers the middle portion; 721 covers the REPORT OUTPUT section.

FIG. 23B

|     |     |     |                                                                 |
| --- | --- | --- | --------------------------------------------------------------- |
|     |     |     | ADDRESS LIST PRINT SETTINGS                                     |
|     |     |     | SEND USER DATA LIST PRINT SETTINGS                              |
|     |     |     | FAX USER DATA LIST PRINT SETTINGS                               |
|     |     | **  | ADDRESS SPECIFICATION SETTINGS                                  |
|     |     | **  | SYSTEM ADMINISTRATOR SETTINGS/ SEND FUNCTION RESTRICTION SETTINGS |
|     |     |     | ADDRESS BOOK PASSWORD SETTING                                   |
|     |     |     | ADDRESS BOOK ACCESS NUMBER SETTING                              |
|     |     |     | NEW ADDRESS RESTRICTION SETTING                                 |
|     |     |     | CONFIRMING INPUT SETTING AT INPUT OF FAX NUMBER                 |
| 711 | 713 | **  | SYSTEM ADMINISTRATOR SETTINGS/LDAP SERVER REGISTRATION          |
|     |     | **  | USER BOX SETTINGS/REGISTRATION                                  |
|     |     |     | BOX SELECTION                                                   |
|     |     |     | BOX NAME REGISTRATION                                           |
|     |     |     | PASSWORD DOCUMENT AUTOMATIC DELETION                            |
|     | 722 |     | URL SEND SETTING                                                |
|     |     |     | PRINT AT STORAGE FROM PRINTER DRIVER                            |
|     |     | **  | INITIALIZATION PRINTING PAPER PHOTOGRAPHIC MODE                 |
|     |     | **  | SCAN SETTING STANDARD MODE                                      |
|     |     | **  | USB MEMORY SETTINGS                                             |
|     |     |     | SCAN SETTING STANDARD MODE                                      |
|     |     |     | CONFIRMING REPRESENTATION AT INSERTION OF USB MEMORY            |
|     |     | O   | UNIQUE DISTRIBUTION VALUES                                      |
|     | 714 | *   | LINE NUMBER SETTING                                             |
|     |     | *   | ABBREVIATED USER NAME                                           |

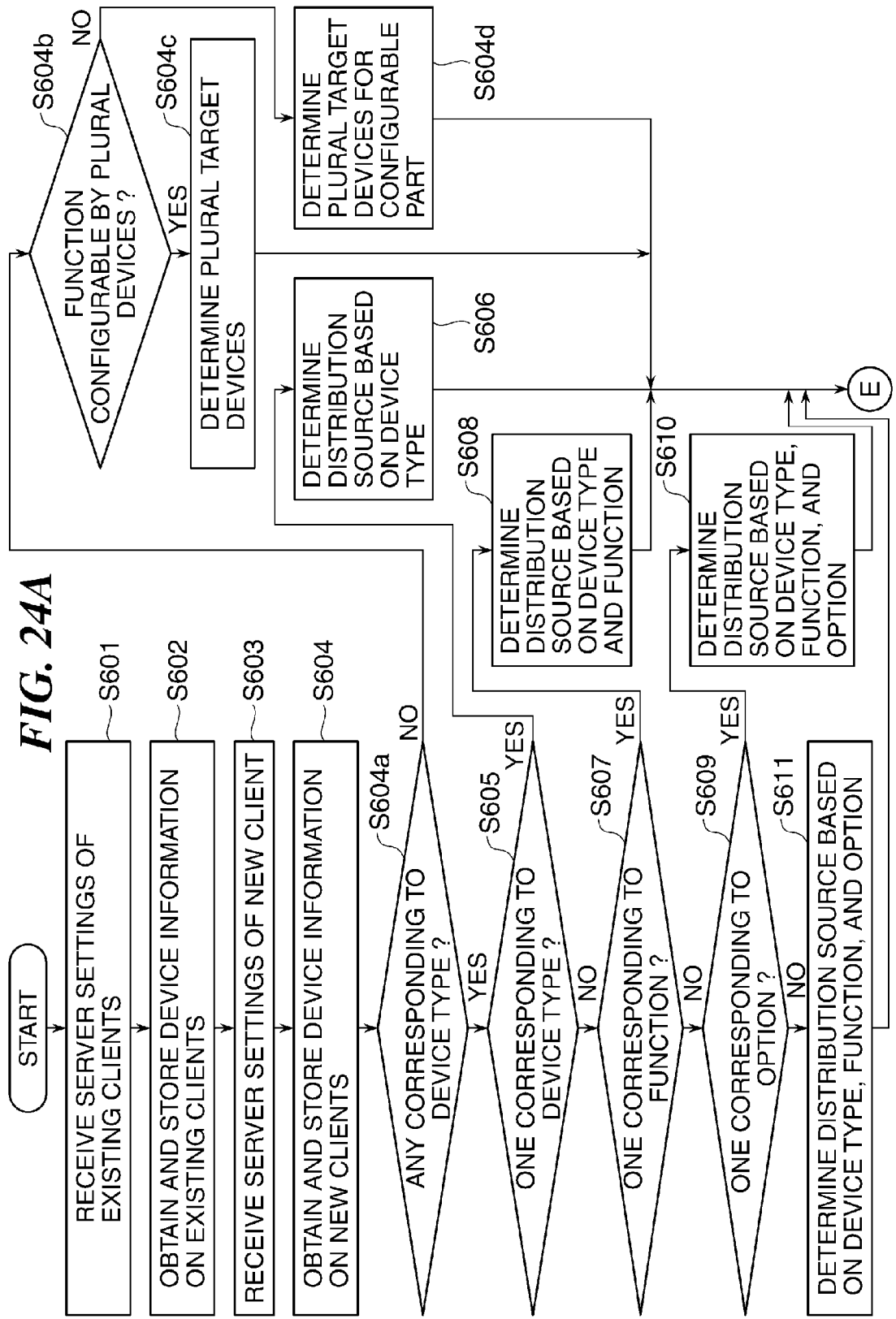

IMAGE PROCESSING SYSTEM, IMAGE PROCESSING APPARATUS, CONTROL METHOD FOR IMAGE PROCESSING APPARATUS, AND STORAGE MEDIUM

BACKGROUND OF THE INVENTION

1. Field of the Invention

The present invention relates to an image processing system in which a plurality of image processing apparatuses such as digital multifunctional peripherals are connected to a network, an image processing apparatus constituting the image processing system, a control method for the image processing apparatus, and a storage medium storing a control program for implementing the method.

2. Description of the Related Art

Conventionally, there has been proposed a technique for distributing distribution values (for example, setting values which an apparatus has, and setting values for each application and each user) from one apparatus to another apparatus among a plurality of apparatuses (Japanese Laid-Open Patent Publication (Kokai) No. H11-175272).

However, in Japanese Laid-Open Patent Publication (Kokai) No. H11-175272, no mention is made of which apparatus is to be a distribution source for an apparatus that has newly joined the system. Thus, when an apparatus as a client newly joins the system, even if a server distributes distribution values to the apparatus, suitable distribution values cannot always be distributed. Moreover, when another client apparatus that has already joined the system is to be a distribution source for distributing distribution values to an apparatus that newly joins the system, even unique setting values of the distribution source are distributed.

SUMMARY OF THE INVENTION

The present invention provides an image processing system, an image processing apparatus, and a control method for the image processing apparatus, which can distribute suitable distribution values to an apparatus that newly joins the system, as well as a storage medium storing a control program for implementing the method.

Accordingly, in a first aspect of the present invention, there is provided an image processing system in which a plurality of image processing apparatuses are connected together for communication with each other, comprising a first obtaining unit adapted to obtain device information on a plurality of already-connected image processing apparatuses among the plurality of image processing apparatuses, a second obtaining unit adapted to obtain device information on a newly-connected image processing apparatus among the plurality of image processing apparatuses, and a control unit adapted to determine an image processing apparatus that is to distribute common distribution values to the newly-connected image processing apparatus among the already-connected plurality of image processing apparatuses based on the device information obtained by the first obtaining unit and the second obtaining unit.

Accordingly, in a second aspect of the present invention, there is provided an image processing apparatus connected to a plurality of image processing apparatuses for communication, comprising a first obtaining unit adapted to obtain device information on a plurality of already-connected image processing apparatuses, a second obtaining unit adapted to obtain device information on a newly-connected image processing apparatus, and a control unit adapted to determine an image processing apparatus that is to be a distribution source that distributes common distribution values to the newly-connected image processing apparatus among the already-connected plurality of image processing apparatuses based on the device information obtained by the first obtaining unit and the second obtaining unit.

Accordingly, in a third aspect of the present invention, there is provided a control method for an image processing apparatus connected to a plurality of image processing apparatuses for communication, comprising a first obtaining step of obtaining device information on a plurality of already-connected image processing apparatuses, a second obtaining step of obtaining device information on a newly-connected image processing apparatus, and a control step of, based on the device information obtained in the first obtaining step and the second obtaining step, determining an image processing apparatus that is to distribute common distribution values to the newly-connected image processing apparatus among the already-connected plurality of image processing apparatuses.

Accordingly, in a fourth aspect of the present invention, there is provided a computer-readable storage medium storing a control program for an image processing apparatus connected to a plurality of image processing apparatuses for communication, the control program comprising a first obtaining step of obtaining device information on a plurality of already-connected image processing apparatuses, a second obtaining step of obtaining device information on a newly-connected image processing apparatus, and a control step of, based on the device information obtained in the first obtaining step and the second obtaining step, determining an image processing apparatus that is to distribute common distribution values to the newly-connected image processing apparatus among the already-connected plurality of image processing apparatuses.

According to the present invention, suitable distribution values can be distributed to an apparatus that newly joins the system.

Further features of the present invention will become apparent from the following description of exemplary embodiments (with reference to the attached drawings).

BRIEF DESCRIPTION OF THE DRAWINGS

FIG. 5 is a view showing an exemplary screen displayed on the console of the image processing apparatus when network settings are configured;

FIGS. 6A and 6B are diagrams showing exemplary common distribution values and unique distribution values;

FIG. 7 is a diagram showing exemplary common distribution values and unique distribution values;

FIGS. 8A and 8B are flowcharts useful in explaining a distribution value distributing process carried out by an image processing apparatus as a server;

FIGS. 10A and 10B are flowcharts useful in explaining a process in a case where an image processing apparatus as a client is made to carry out a process for distributing common distribution values to an image processing apparatus as a new client in the distribution value distributing process carried out by an image processing apparatus as a server;

FIG. 11 is a flowchart useful in explaining a process carried out by an image processing apparatus as a client, which carries out the common distribution value distributing process;

FIG. 13 is a block diagram useful in explaining a basic arrangement of an image processing apparatus (SFP);

FIG. 14 is a diagram showing exemplary common distribution values and unique distribution values;

FIG. 16 is a diagram showing exemplary common distribution values and unique distribution values;

FIGS. 17A and 17B are flowcharts useful in explaining a distribution value distributing process carried out by an image processing apparatus as a server;

FIGS. 20A and 20B are diagrams showing exemplary common distribution values and unique distribution values;

FIGS. 23A and 23B are diagrams showing exemplary common distribution values and unique distribution values; and FIGS. 24A and 24B are flowcharts useful in explaining a distribution value distributing process carried out by an image processing apparatus as a server.

DESCRIPTION OF THE EMBODIMENTS

The present invention will now be described in detail with reference to the drawings showing preferred embodiments thereof.

Figure 1:
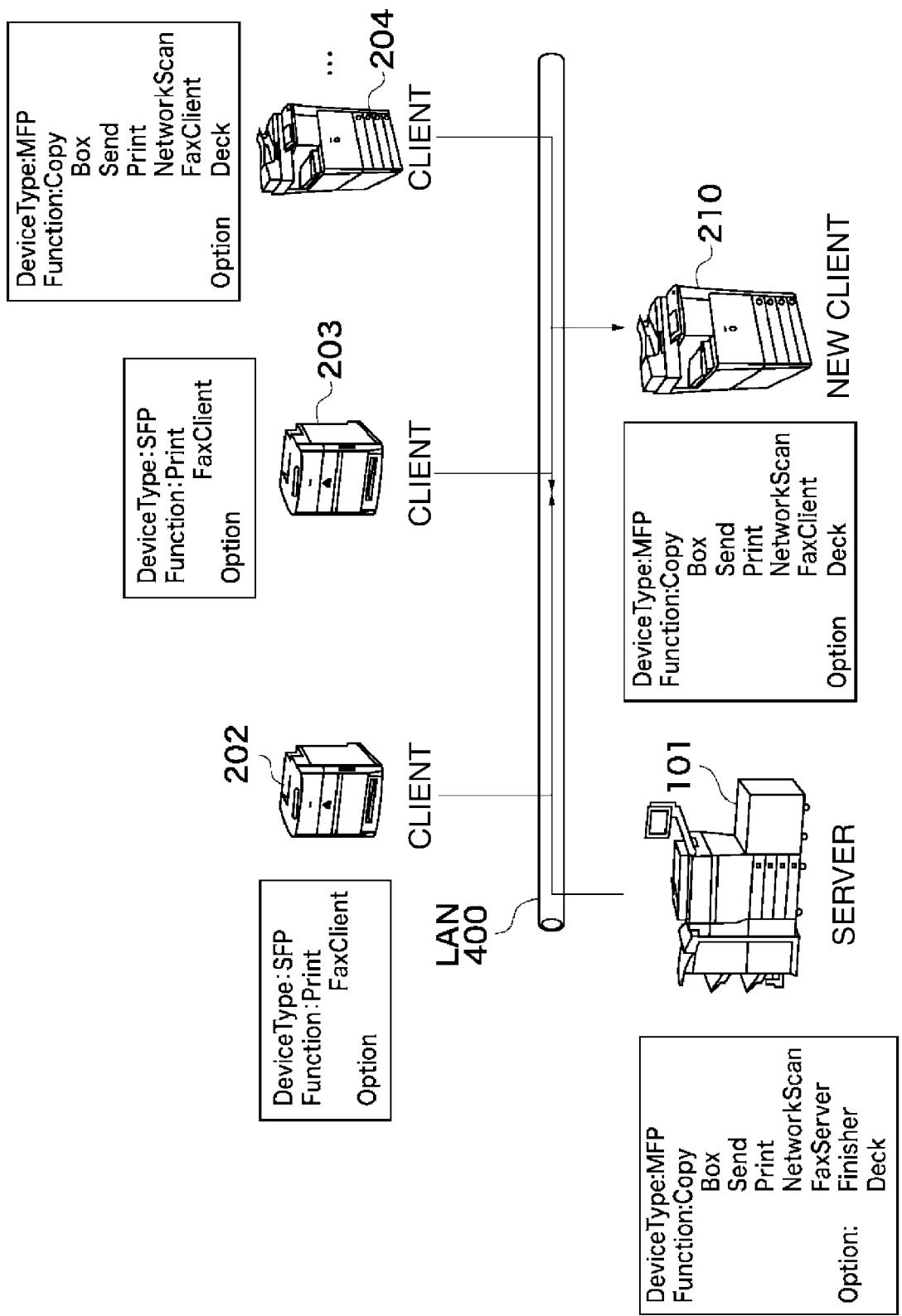
FIG. 1 is a view useful in explaining an exemplary arrangement of an image processing system according to a first embodiment of the present invention.

FIG. 1 is a view useful in explaining an exemplary arrangement of an image processing system according to a first embodiment of the present invention.

Referring to FIG. 1, the image processing system according to the present embodiment is constructed such that a plurality of image processing apparatuses 101, 202, 203, 204, and 210 are connected together for communication with each other via a LAN 400 or the like.

In the present embodiment, it is assumed that the image processing apparatus 101 is a server, the image processing apparatus 202, 203, and 204 are clients connected to the system, and the image processing apparatus 210 is a new client that is newly connected to the system.

Also, it is assumed that the image processing apparatuses 101, 204, and 210 are MFPs (multifunction printers), and the image processing apparatus 202 and 203 are SFPs (single-function printers).

Figures 2, 3:
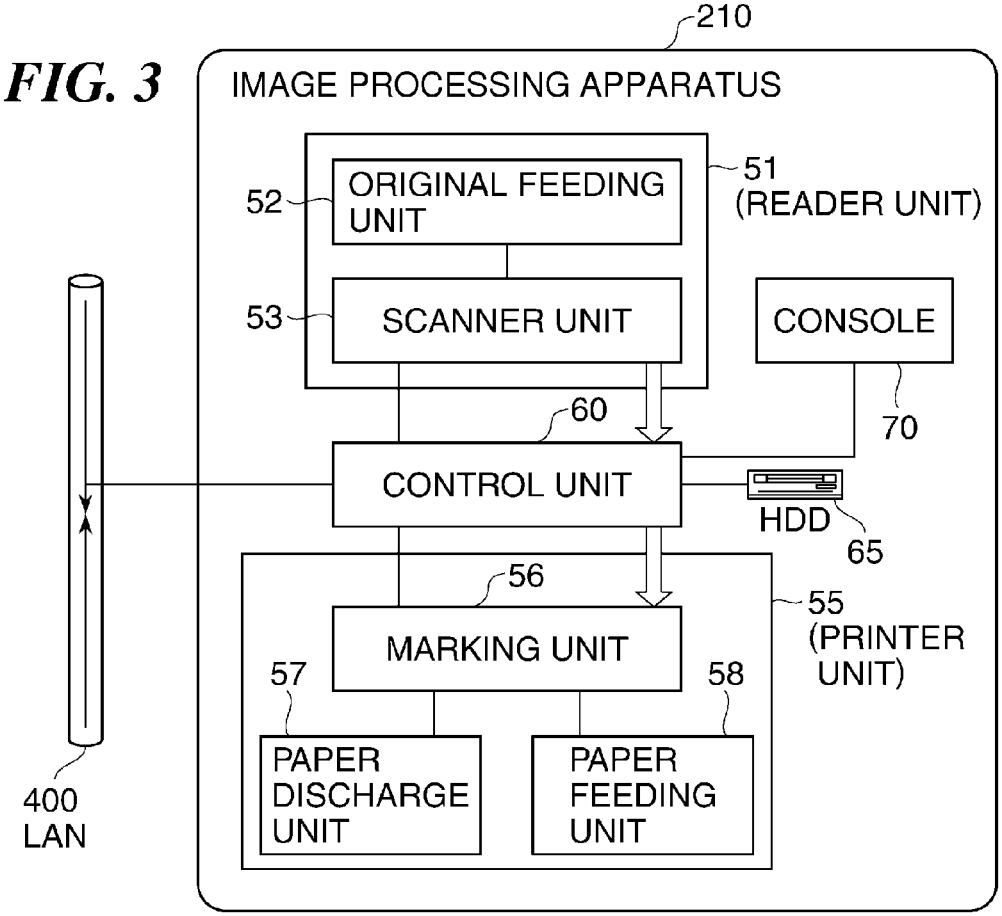
FIG. 2 is a diagram showing exemplary device information on an image processing apparatus.
FIG. 3 is a block diagram useful in explaining a basic arrangement of an image processing apparatus (MFP)

FIG. 2 is a diagram showing exemplary device information on an image processing apparatus.

Referring to FIG. 2, Devicetype 301 is information indicative of whether the image processing apparatus is an MFP or SFP.

In the example shown in FIG. 2, Function 302 indicates that the image processing apparatus has a copy function, a box function, a send function, a print function, a network scan function, and a facsimile (server) function.

Option 303 indicates hardware-related options, and in the example shown in FIG. 2, Option 303 indicates that the image processing apparatus has a finisher and a sheet-feeding deck. In the present embodiment, an image processing apparatus that is to be a distribution source for distribution values is determined according to the device information.

Next, a description will be given of a basic arrangement of an image processing apparatus (MFP) with reference to FIG. 3.

Referring to FIG. 3, the image processing apparatus (MFP) has a reader unit 51, a printer unit 55, a control unit 60, a console 70, and an HDD 65.

The reader unit 51 optically reads an image on an original and converts the same into image data. The reader unit 51 is comprised of a scanner unit 53 having a function for reading an image on an original, and an original feeding unit 52 having a function for conveying an original. It should be noted that some models may not have the original feeding unit 52.

The printer unit 55 conveys recording paper, prints images on the recording paper, and discharges the recording paper from the apparatus. The printer unit 55 is comprised of a paper feeding unit 58 having a plurality of kinds of recording paper cassettes, a marking unit 56 that transfers and fixes image data onto recording paper, and a paper discharge unit 57 that sorts and staples recording paper with image data printed thereon and outputs the same from the apparatus.

The control unit 60 is electrically connected to the reader unit 51 and the printer unit 55, and further connected to the LAN 400. The control unit 60 has a copy function of controlling the reader unit 51 to read an image on an original, and controlling the printer unit 55 to output image data read by the reader unit 51 to recording paper.

Also, the control unit 60 has a network scanner function of converting image data read by the reader unit 51 into code data, and sending the code data to a host computer, not shown, via the LAN 400. Further, the control unit 60 has a printer function of converting the code data received from the host computer via the LAN 400 into image data, and outputting the image data to the printer unit 55.

The console 70 has a liquid crystal display unit, a touch panel input device adhered to the liquid crystal display unit, and a plurality of hardware keys, and offers a user I/F for a user to carry out various operations. Signals inputted via the touch panel or the hardware keys are transmitted to the control unit 60, and image data transmitted from the control unit 60 is displayed on the liquid crystal display unit.

Also, the console 70 has a box function (document storage function) of storing originals read from the reader unit 51 as documents in the HDD 65. The box function includes a function of printing stored documents as well as the function of storing documents.

Next, a description will be given of an exemplary display screen of the console 70 of the image processing apparatus (MFP) with reference to FIG. 4.

Figure 4:
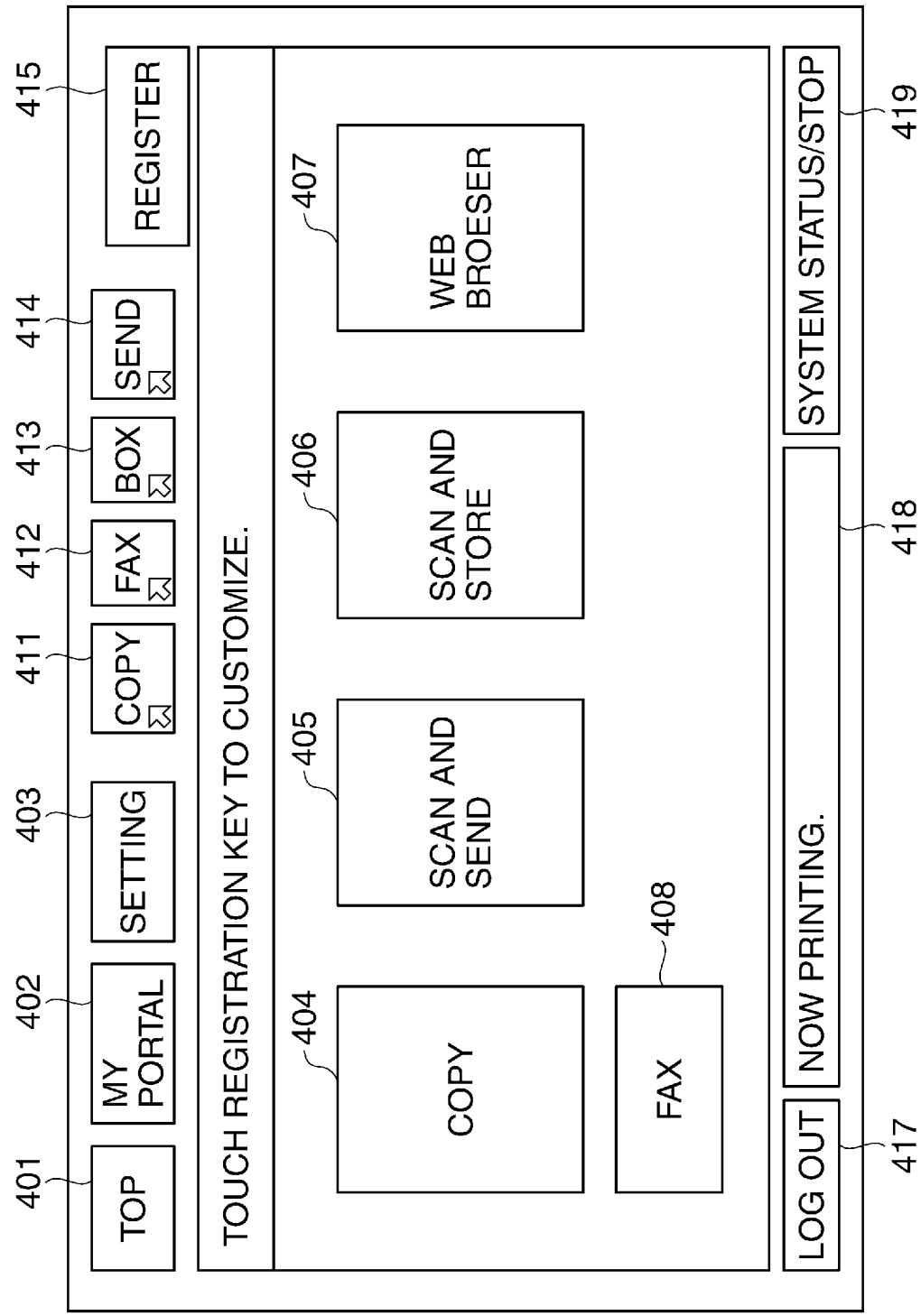
FIG. 4 is a view showing an exemplary display screen of a console of the image processing apparatus.

Referring to FIG. 4, a top menu key 401 is a key that is prepared so as to return to a screen display (login screen display) of a top menu, not shown. A my portal key 402 is a key that is depressed so as to display a screen on which only information relating to a specific user who has logged in (such as information on a job inputted by a user) is included.

A setting key 403 is a key for displaying a screen on which environmental information such as setting values which the apparatus has, network settings, and setting values for each application and each user is set. Keys 404 to 408 are keys for various functions and keys 411 to 414 are shortcut keys for various functions. A registration key 415 is a key for editing a personalized screen.

A key 417 is a key for logging out, and a status line 418 is an area where, for example, information on a job being in execution is displayed, and warning information on consumables (such as toner) is displayed. A system status key 419 is a key for displaying a screen on which information such as a list of jobs being in execution and a list of job logs can be browsed.

FIG. 5 is a view showing an exemplary screen displayed on the console 70 when network settings are configured on the image processing apparatus 210. The screen is called by operating the setting key 403 shown in FIG. 4.

On the screen are displayed an IP address setting 701, a subnet mask setting 702, a gateway setting 703, and a server address setting 704. On the console 70 of the image processing apparatus 210, a user sets a server address according to the screen to construct a client/server relationship, and newly joins the image processing system shown in FIG. 1. In response to the server address setting, distribution of distribution values is automatically started.

FIGS. 6A to 7 are diagrams showing exemplary common distribution values and unique distribution values.

Figure 6B:
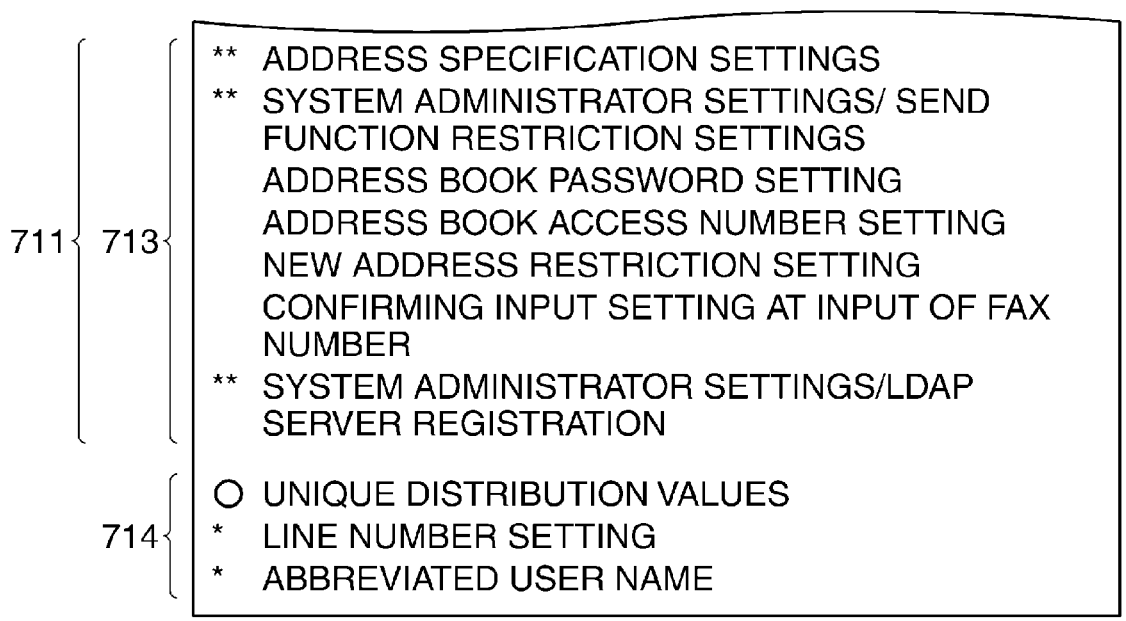

Common distribution values 711 and unique distribution values 714 shown in FIGS. 6A and 6B are described in a language shown in FIG. 7 (for example, XML (eXtensible Markup Language)) and stored in, for example, an HDD of an image processing apparatus. The distribution values shown in FIGS. 6A to 7 are exemplary distribution values of which distribution is started according to the server address setting shown in FIG. 5. Of the common distribution values 711, distribution values 712 are particularly basic setting values of the apparatus, and distribution values 713 are setting values differing according to provided functions but sharable by a plurality of devices. The unique distribution values 714 are unique setting values that are not sharable by a plurality of devices.

The common distribution values 711 can be obtained by making an exact copy of setting values of an image processing apparatus as another client when the image processing apparatus 210 as a new client joins the image processing system shown in FIG. 1.

When the image processing apparatus 210 as a new client configures the above described server address setting for the image processing apparatus 101 as a server, the image processing apparatus 101 obtains device information from the image processing apparatus 210.

The image processing apparatus 101 refers to Devicetype 301 of the device information in FIG. 2, and determines that the image processing apparatus 204, which is an MFP, is to be a distribution source for the common distribution values 711 among the other image processing apparatuses 202, 203, and 204 because the image processing apparatus 210 is an MFP.

It should be noted that when there are a plurality of MFPs among the image processing apparatuses as clients, the image processing apparatus 101 refers to Function 302 and Option 303 of the remaining device information. Then, the image processing apparatus 101 determines that an image processing apparatus whose device information is closest to the image processing apparatus 210 is to be a distribution source for the common distribution values 711.

Moreover, regarding unique distribution values, the image processing apparatus 101 determines values unique to the image processing apparatus 210, and distributes them to the image processing apparatus 210 (described later).

Figure 8B:
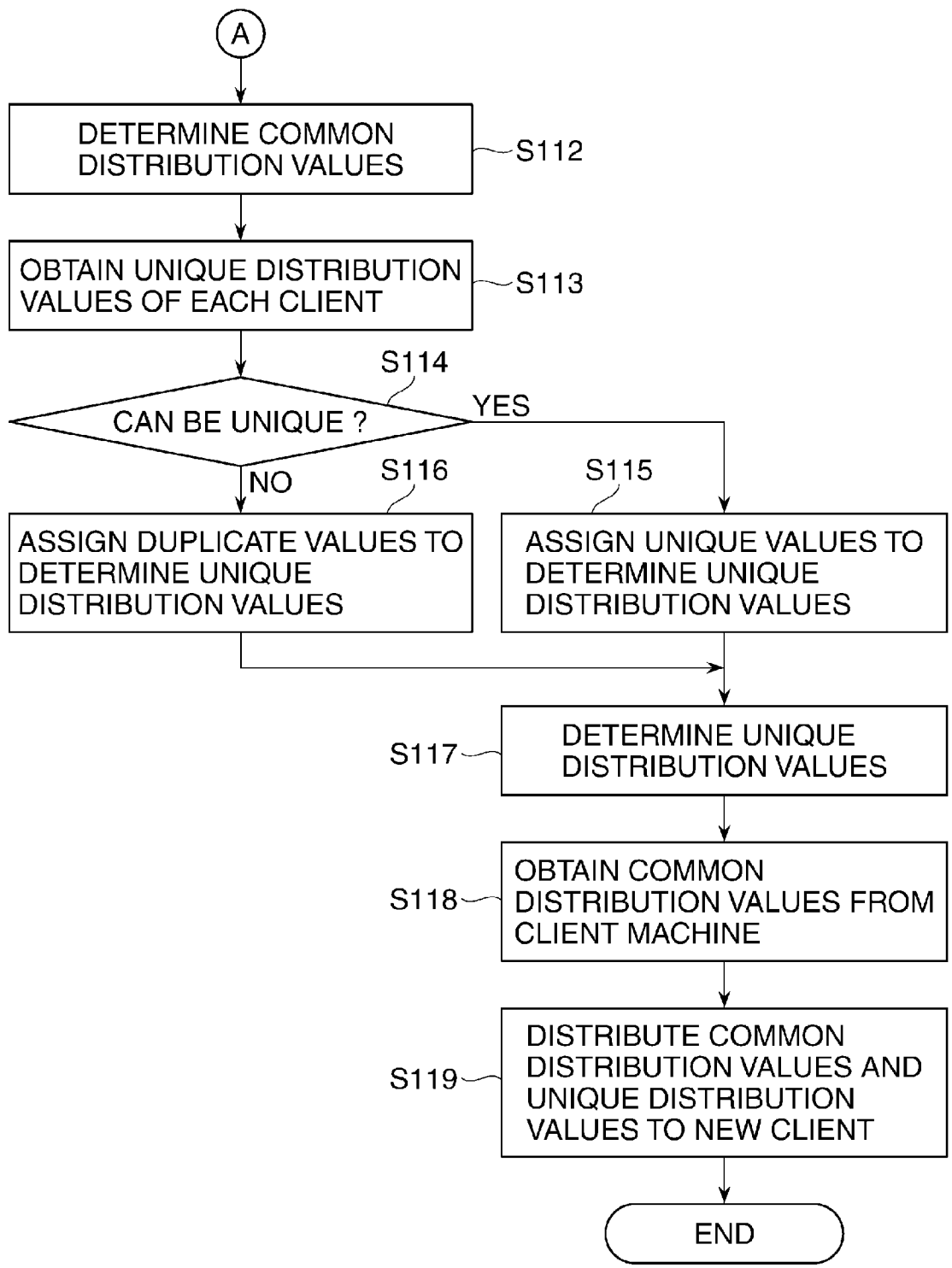

Next, a description will be given of a distribution value distributing process carried out by the image processing apparatus 101 as a server with reference to FIGS. 8A and 8B. Each process in FIGS. 8A and 83 is executed by a CPU or the like of the control unit 60 in accordance with a control program stored in a ROM, the HDD 65, or the like of the image processing apparatus 101, which is loaded into a RAM. It is assumed here that the image processing apparatus 101 distributes both unique distribution values and common distribution values to the image processing apparatus 210.

In step S101, the control unit 60 receives server address settings transmitted from the image processing apparatuses 202, 203, and 204 as clients, and proceeds to step S102.

In the step S102, the control unit 60 obtains device information from the image processing apparatuses 202, 203, and 204, stores the obtained device information in the HDD 65, and proceeds to step S103. It should be noted that the step S102 is a process that is an example of a first obtaining unit in the present embodiment.

In the step S103, the control unit 60 receives a server address setting transmitted from the image processing apparatus 210 as a new client, and proceeds to step S104.

In the step S104, the control unit 60 obtains device information from the image processing apparatus 210, stores the obtained device information in the HDD 65, and proceeds to step S105. It should be noted that the step S104 is a process that is an example of a second obtaining unit in the present embodiment.

In the step S105, the control unit 60 checks Devicetype 301 (see FIG. 2) of the obtained device information. Specifically, the control unit 60 determines whether or not the number of device types corresponding to the device type of the image processing apparatus 210 among the respective device types of the image processing apparatuses 202, 203, and 204 is one.

When the number of device types corresponding to the device type of the image processing apparatus 210 is one, the control unit 60 proceeds to step S106, and when the number of device types corresponding to the device type of the image processing apparatus 210 is not one (i.e. plural), the control unit 60 proceeds to step S107.

In the step S106, the control unit 60 determines that a client image processing apparatus having device information including the device type corresponding to the device type of the image processing apparatus 210 is to be a distribution source for distribution values, and proceeds to step S112.

In the step S107, the control unit 60 checks Function 302 (see FIG. 2) of the obtained device information. Specifically, the control unit 60 determines whether or not the number of pieces of function information corresponding to function information on the image processing apparatus 210 among the respective pieces of function information on the image processing apparatuses 202, 203, and 204 is one.

When the number of function information pieces corresponding to the function information on the image processing apparatus 210 is one, the control unit 60 proceeds to step S108, and when the number of function information pieces corresponding to the function information on the image processing apparatus 210 is not one (i.e. plural), the control unit 60 proceeds to step S109.

In the step S108, the control unit 60 determines that a client image processing apparatus having device information including the function information corresponding to the function information on the image processing apparatus 210 is to be a distribution source for distribution values, and proceeds to the step S112.

In the step S109, the control unit 60 checks Option 303. (see FIG. 2) of the obtained device information. Specifically, the control unit 60 determines whether or not the number of options corresponding to an option of the image processing apparatus 210 among the respective options of the image processing apparatuses 202, 203, and 204 is one.

When the number of options corresponding to the option of the image processing apparatus 210 is one, the control unit 60 proceeds to step S110, and when the number of options corresponding to the option of the image processing apparatus 210 is not one (i.e. plural), the control unit 60 proceeds to step S111.

In the step S110, the control unit 60 determines that a client image processing apparatus having device information including the option corresponding to the option of the image processing apparatus 210 is to be a distribution source for distribution values, and proceeds to the step S112.

In the step S111, the control unit 60 determines that an arbitrary image processing apparatus is to be a distribution source for distribution values based on the obtained device information. Here, for example, the control unit 60 determines that the only one image processing apparatus 204 whose device type corresponds to the device type of the image processing apparatus 210 is to be a distribution source for distribution values based on the obtained device information, and proceeds to the step S112.

In the step S112, the control unit 60 confirms the distribution source for common distribution values 711 (see FIGS. 6A to 7), which are to be distributed to the image processing apparatus 210, and proceeds to step S113.

In the step S113, the control unit 60 obtains unique distribution values 714 (see FIGS. 6B and 7) from each of the client image processing apparatuses 202, 203, and 204, and proceeds to step S114. It should be noted that the step S113 is a process that is an example of a third obtaining unit in the present embodiment.

In the step S114, based on the information on the unique distribution values obtained in the step S113, the control unit 60 determines whether or not unique distribution values to be distributed to the image processing apparatus 210 can be unique values.

For example, assume that a line number 2 and an abbreviated user name 33-OA2 are obtained from the image processing apparatus 202, a line number 3 and an abbreviated user name 33-OA3 are obtained from the image processing apparatus 203, and a line number 4 and an abbreviated user name 33-OA4 are obtained from the image processing apparatus 204. Also, assume that the image processing apparatus 101 is using a line number 1 and an abbreviated user name 33-OA1.

In this case, assuming that an upper limit to a line number is 8, at maximum, the control unit 60 determines that the unique distribution values can be unique values, and proceeds to step S115.

In the step S115, the control unit 60 automatically issues and assigns a line number 5 and an abbreviated user name 33-OA5 to the image processing apparatus 210, and proceeds to step S117.

On the other hand, assuming that an upper limit to a line number is 4, at maximum, the control unit 60 determines that the unique distribution values cannot be unique values, and proceeds to step S116.

In the step S116, the control unit 60 assigns the duplicate line number 1 and abbreviated user name 33-OA1 to the image processing apparatus 210, and proceeds to the step S117.

In the step S117, the control unit 60 confirms the unique distribution values that are to be distributed to the image processing apparatus 210, and proceeds to step S118.

In the step S118, the control unit 60 obtains common distribution values from the client image processing apparatus as the distribution source confirmed in the step S112, and proceeds to step S119.

In the step S119, the control unit 60 distributes the common distribution values obtained in the step S118 and the unique distribution values confirmed in the step S117 to the image processing apparatus 210, and terminates the process.

Figure 9:
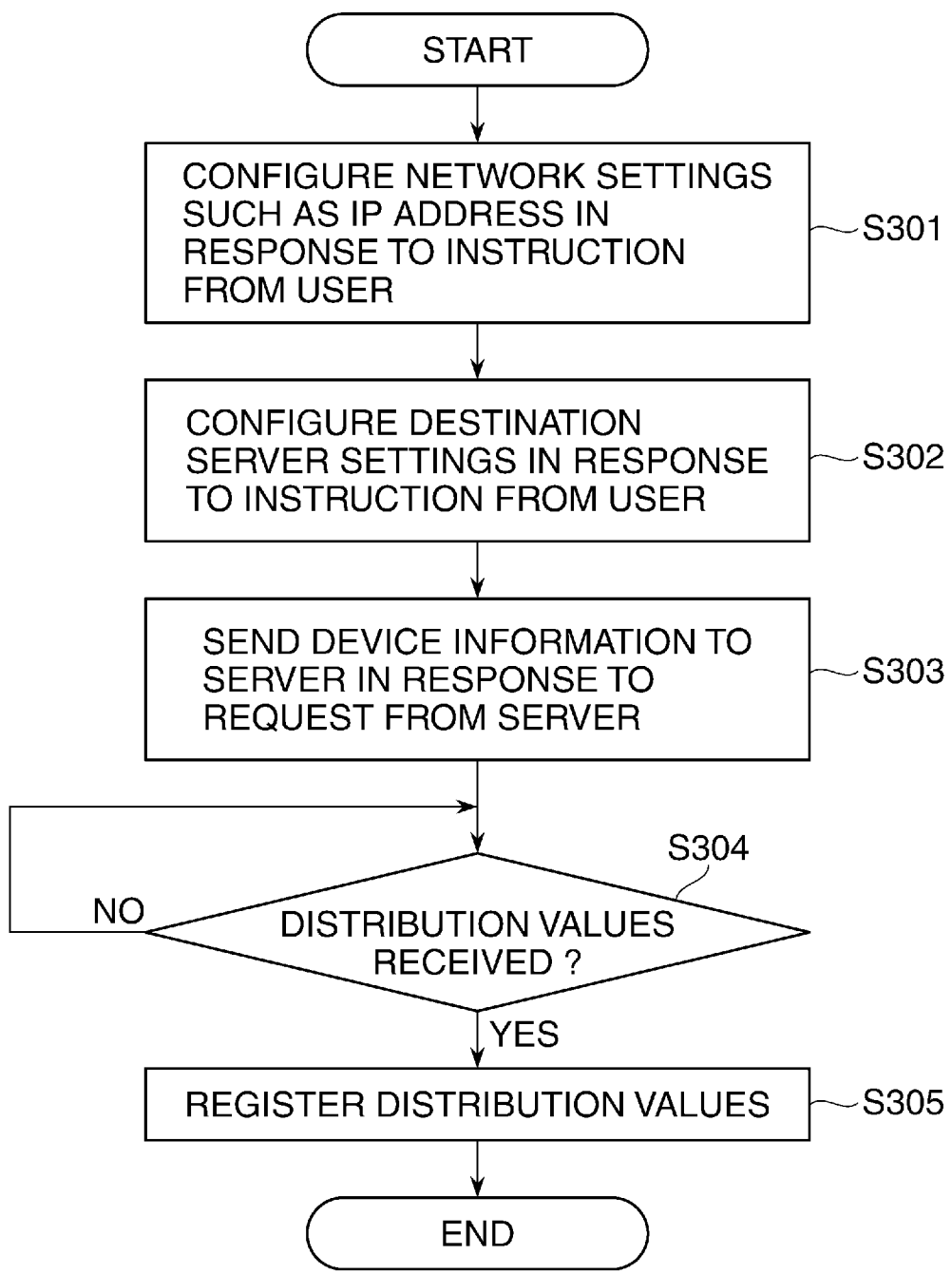
FIG. 9 is a flowchart useful in explaining a process carried out by an image processing apparatus as a new client.

Next, a description will be given of processes carried out by the image processing apparatus 210 as a new client with reference to FIG. 9. Each process in FIG. 9 is executed by a CPU or the like of the control unit 60 in accordance with a control program stored in a ROM, the HDD 65, or the like of the image processing apparatus 210 loaded into a RAM. In the following description, it is assumed that the control unit 60 of the image processing apparatus 210 is referred to as the control unit 60A for the convenience of explanation.

Referring to FIG. 9, in step S301, the control unit 60A configures network settings such as an IP address based on a user's instruction on the network setting screen (see FIG. 5) of the console 70, and proceeds to step S302.

In the step S302, the control unit 60A configures server address settings based on a user's instruction on the network setting screen (see FIG. 5) of the console 70, and proceeds to step S303.

In the step S303, the control unit 60A sends device information to the image processing apparatus 101 in response to a device information request from the image processing apparatus 101 that has issued a connection request, and proceeds to step S304.

In the step S304, the control unit 60A determines whether or not distribution values have been received, and when distribution values have been received, the control unit 60A proceeds to step S305.

In the step S305, the control unit 60A registers the received distribution values as setting values in the HDD 65 or the like, and terminates the process.

As described above, in the present embodiment, convenience for users can be enhanced because the suitable distribution values can be distributed to the image processing apparatus 210 that newly joins the system, and the distribution values are automatically distributed in a stage in which the image processing apparatus 210 has configured server settings.

Although in the present embodiment, distribution of common distribution values to the image processing apparatus 210 as a new client is carried out by the image processing apparatus 101 as a server, the distribution may be carried out by the image processing apparatus as a client (the image processing apparatus 204 in the present embodiment).

Figure 10B:
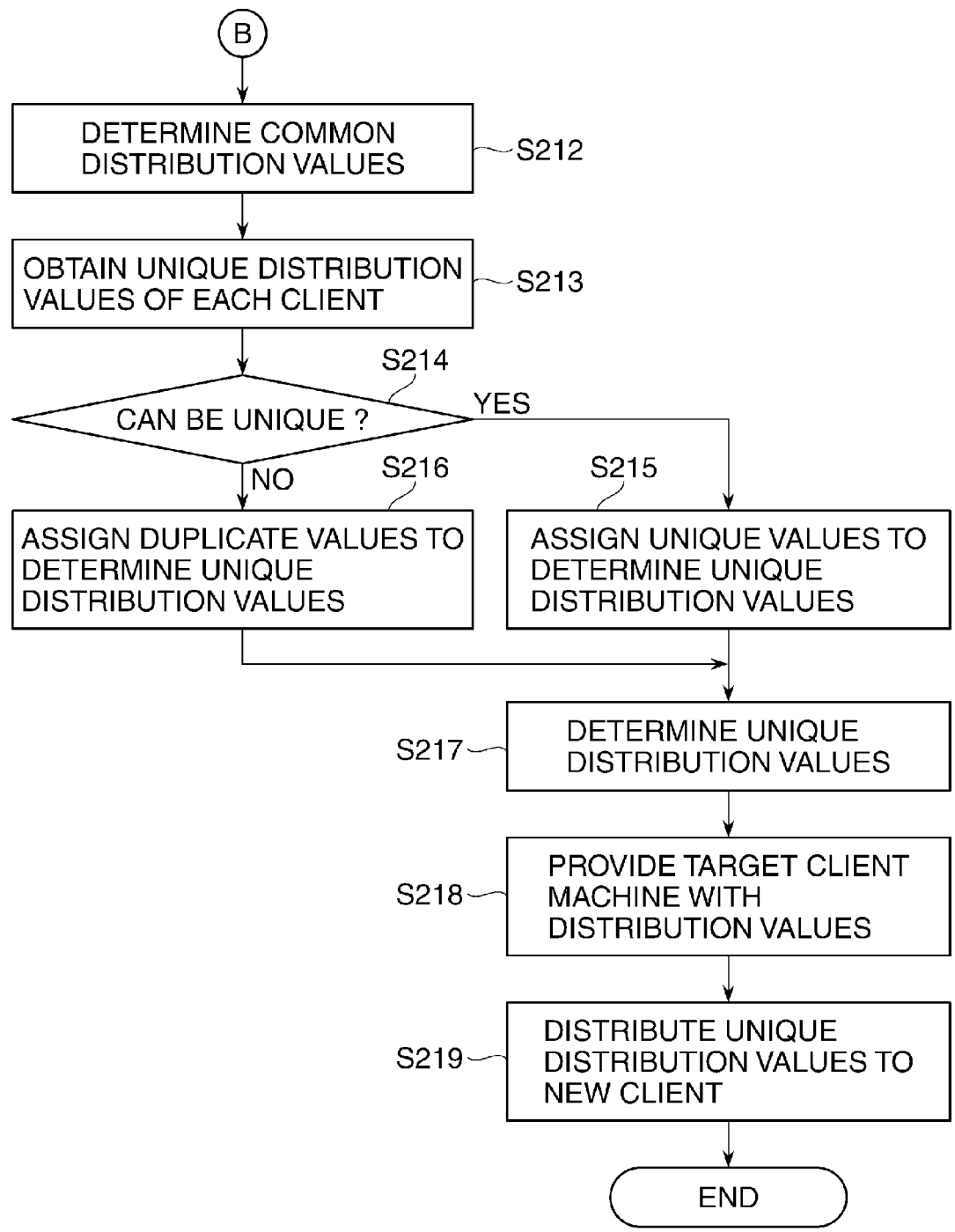

FIGS. 10A and 10B are flowcharts useful in explaining a process in a case where an image processing apparatus as a client is made to carry out the process for distributing common distribution values to an image processing apparatus as a new client in the distribution value distributing process carried out by an image processing apparatus as a server.

Steps S201 to S217 in FIGS. 10A and 10B are the same as the steps S101 to S117 in FIGS. 8A and 8B.

In step S218, the control unit 60 of the image processing apparatus 101 instructs a client image processing apparatus assigned as a distribution source in the step S212 to distribute common distribution values to the image processing apparatus 210, and proceeds to step S219.

In the step S219, the control unit 60 distributes the unique distribution values determined in the step S217 to the image processing apparatus 210, and terminates the process.

FIG. 11 is a flowchart useful in explaining a process carried out by the image processing apparatus 204 as a client, which carries out a common distribution value distributing process. Each process in FIG. 11 is executed by a CPU or the like of a control unit (not shown) in accordance with a control program stored in a ROM, an HDD (not shown), or the like of the image processing apparatus 204, which is loaded into a RAM (not shown).

In step S401, the control unit determines whether or not a common distribution value distributing instruction has been received from the image processing apparatus 101 as a server, and proceeds to step S402.

In the step S402, the control unit 60 distributes common distribution values to the image processing apparatus 210 as a new client, and terminates the process.

Next, a description will be given of an image processing system according to a second embodiment of the present invention with reference to FIGS. 12 to 14.

Figure 12:
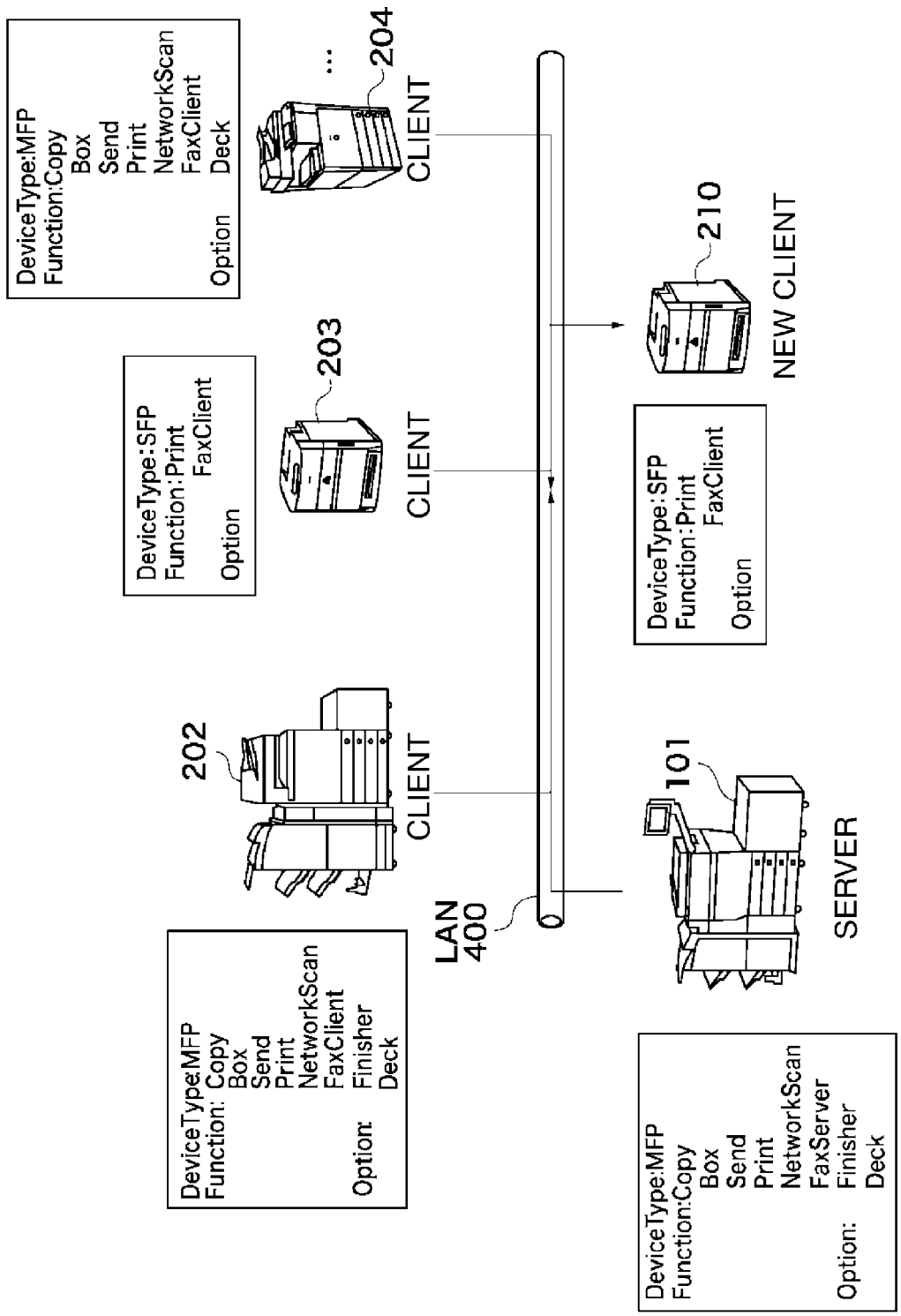
FIG. 12 is a view useful in explaining an exemplary arrangement of an image processing system according to a second embodiment of the present invention.

FIG. 12 is a view useful in explaining an exemplary arrangement of the image processing system according to the second embodiment of the present invention.

In the present embodiment, it is assumed that an image processing apparatus 210 as a new client and an image processing apparatus 203 as a client are SFPs, and an image processing apparatus 101 as a server and image processing apparatuses 202 and 204 as clients are MFPs.

FIG. 13 is a block diagram useful in explaining a basic arrangement of the image processing apparatus (SFP) 210.

Referring to FIG. 13, the image processing apparatus 210 has a printer unit 55, a control unit 60, and a console 70. In the present embodiment, the image processing apparatus 210 does not have a copy function, a send function, and a box function because a reader unit and an HDD are not connected to the control unit 60.

FIG. 14 is a diagram showing exemplary common distribution values and unique distribution values. In FIG. 14, distribution values 712 of common distribution values 711 are the same as those in the above described first embodiment (FIG. 6A), but distribution values 713 are different from those in the above described first embodiment. The distribution values 713 are only setting values required for an SFP (for example, settings relating to facsimile transmission are omitted). Unique distribution values 714 are the same as those in the above described first embodiment (FIG. 6B).

In the present embodiment, because the image processing apparatus 210 as a new client is an SFP, the image processing apparatus 101 as a server determines that the image processing apparatus 203, which is an SFP, is to be a distribution source for distribution values among the image processing apparatuses 202, 203, and 204 as clients.

It should be noted that when there are a plurality of SFPs among the image processing apparatuses as clients, the image processing apparatus 101 refers to Function 302 and Option 303 (see FIG. 2) of the remaining device information. Then, the image processing apparatus 101 determines that an image processing apparatus whose device information is closest to the image processing apparatus 210 is to be a distribution source for distribution values. Other arrangements and effects are the same as those in the above described first embodiment.

Next, a description will be given of an image processing system according to a third embodiment of the present invention with reference to FIGS. 15 to 17B.

Figure 15:
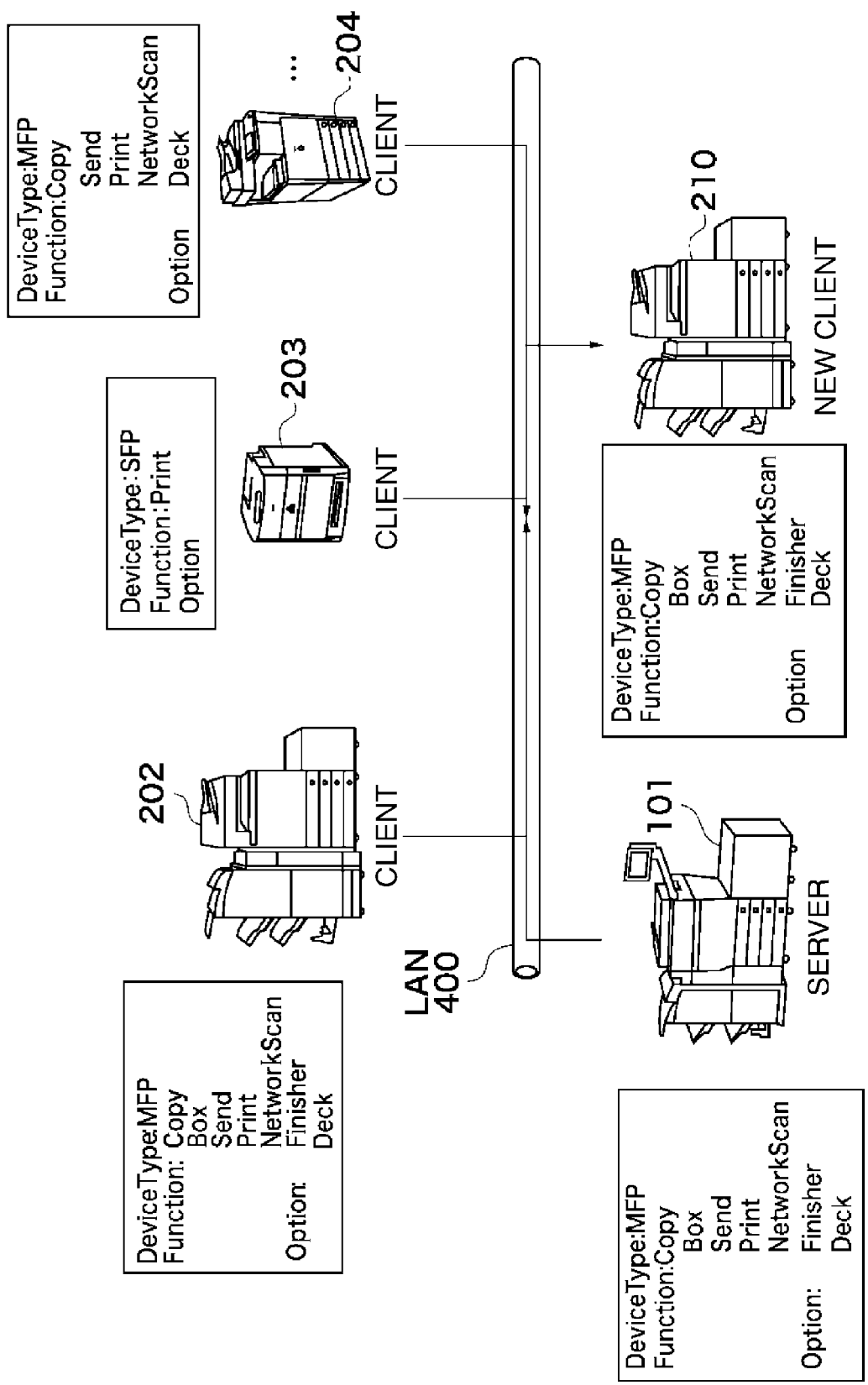
FIG. 15 is a view useful in explaining an exemplary arrangement of an image processing system according to a third embodiment of the present invention.

FIG. 15 is a view useful in explaining an exemplary arrangement of the image processing system according to the third embodiment of the present invention.

As shown in FIG. 15, it is assumed in the present embodiment that an image processing apparatus 101 as a server, an image processing apparatus 210 as a new client, and an image processing apparatus 202 as a client are MFPs having a box function. Also, it is assumed that an image processing apparatus 204 as a client is an MFP that does not have a box function an image processing apparatus 203 as a client is an SFP that does not have a box function.

FIG. 16 is a diagram showing exemplary common distribution values and unique distribution values. In FIG. 16, distribution values 712 of common distribution values 711 are the same as those in the above described first embodiment (FIG. 6A), but distribution values 713 are only setting values required for a box function, and settings relating to facsimile transmission are omitted because there is no facsimile function. Also, regarding unique distribution values 714, there are no setting values such as a line number and an abbreviated user name as in the above described first embodiment (FIG. 6B).

Further, in the present embodiment, to determine a device as a distribution source based on provided functions, first, the image processing apparatus 101 refers to Function 302 of device information, and determines an image processing apparatus as a distribution source for distribution values from among a plurality of image processing apparatuses as clients.

It should be noted that when there are a plurality of image processing apparatuses having a box function among the image processing apparatuses as clients, the image processing apparatus 101 refers to Devicetype 301 and Option 303 (see FIG. 2) of the remaining device information. Then, the image processing apparatus 101 determines that an image processing apparatus whose device information is closest to the image processing apparatus 210 is to be a distribution source for distribution values.

Figure 17B:
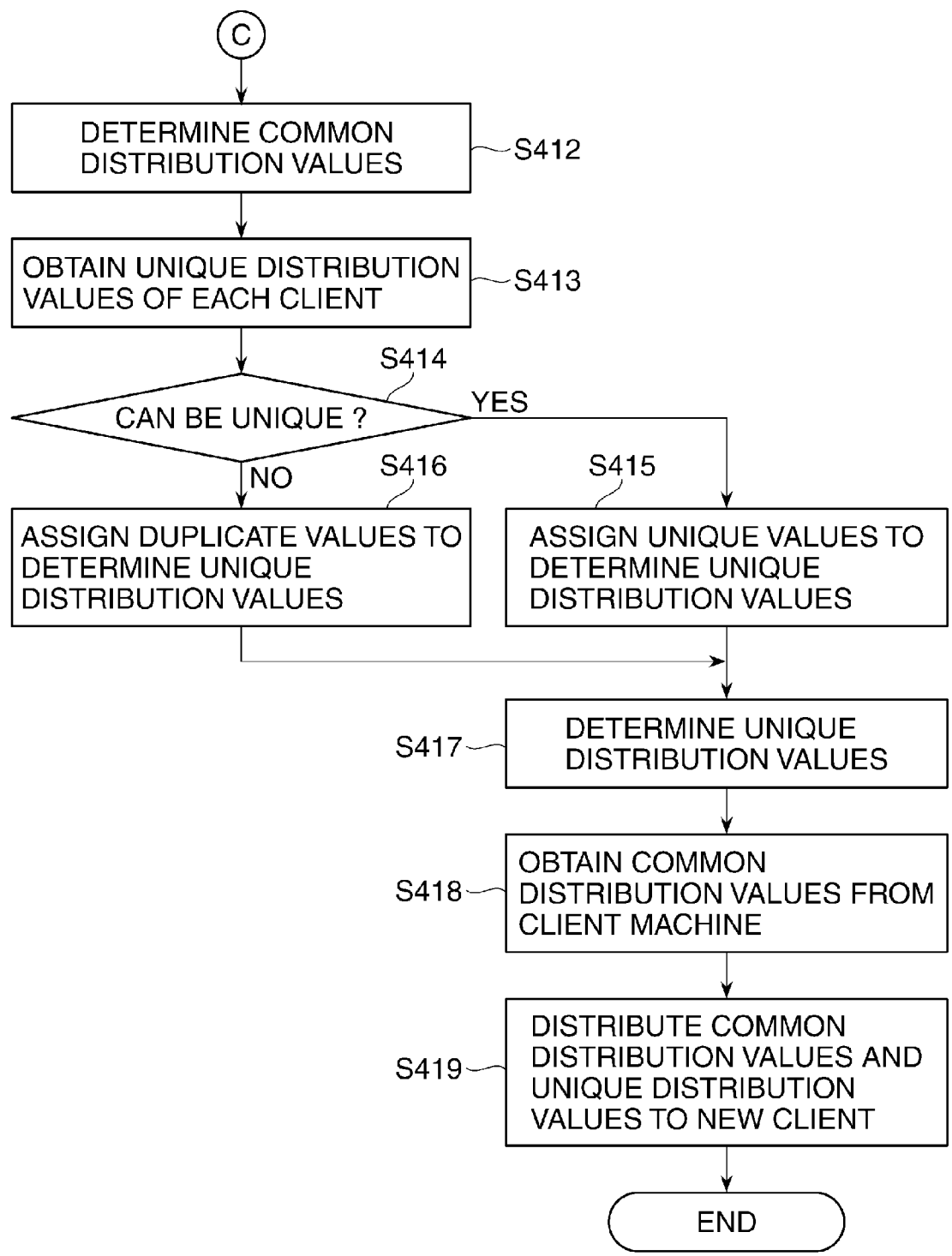

FIGS. 17A and 17B are flowcharts useful in explaining a distribution value distributing process carried out by the image processing apparatus 101 as a server. Each process in FIGS. 17A and 173 is executed by a CPU or the like of a control unit 60 in accordance with a control program stored in a ROM, an HDD 65, or the like of the image processing apparatus 101 loaded into a RAM.

Steps S401 to S404 and steps S411 to S419 in FIGS. 17A and 17B are the same as the steps S101 to S104 and the steps S111 to S119, respectively, in the above described first embodiment (FIGS. 8A and 8B), and therefore, description thereof is omitted.

In step S405, the control unit 60 checks Function 302 (FIG. 2) of the obtained device information. Specifically, the control unit 60 determines whether or not the number of function information pieces corresponding to function information on the image processing apparatus 210 among respective pieces of function information on the image processing apparatuses 202, 203, and 204 is one.

When the number of function information pieces corresponding to the function information on the image processing apparatus 210 is one, the control unit 60 proceeds to step S406, and when the number of function information pieces corresponding to the function information on the image processing apparatus 210 is not one (i.e. plural), the control unit 60 proceeds to the step S407.

In the step S406, the control unit 60 determines that an image processing apparatus as a client having device information including the function information corresponding to the function information on the image processing apparatus 210 is to be a distribution source for distribution values, and proceeds to step S412.

In the step S407, the control unit 60 checks Function 302 (see FIG. 2) of the obtained device information. Specifically, the control unit 60 determines whether or not the number of options corresponding to an option of the image processing apparatus 210 among respective options of the image processing apparatuses 202, 203, and 204 is one.

When the number of options corresponding to the option of the image processing apparatus 210 is one, the control unit 60 proceeds to step S408, and when the number of options corresponding to the option of the image processing apparatus 210 is not one (i.e. plural), the control unit 60 proceeds to step S409.

In the step S408, the control unit 60 determines that a client image processing apparatus having device information including the option corresponding to the option of the image processing apparatus 210 is to be a distribution source for distribution values, and proceeds to the step S412.

In the step S409, the control unit 60 checks Devicetype 301 (see FIG. 2) of the obtained device information. Specifically, the control unit 60 determines whether or not the number of device types corresponding to the device type of the image processing apparatus 210 among respective device types of the image processing apparatuses 202, 203, and 204 is one.

When the number of device types corresponding to the device type of the image processing apparatus 210 is one, the control unit 60 proceeds to step S410, and when the number of device types corresponding to the device type of the image processing apparatus 210 is not one (i.e. plural), the control unit 60 proceeds to the step S411.

In the step S410, the control unit 60 determines that a client image processing apparatus having device information including the device type corresponding to the device type of the image processing apparatus 210 is to be a distribution source for distribution values, and proceeds to the step S412. Other arrangements and effects are the same as those in the above described first embodiment.

Next, a description will be given of an image processing system according to a fourth embodiment of the present invention with reference to FIGS. 18 to 21B.

Figure 18:
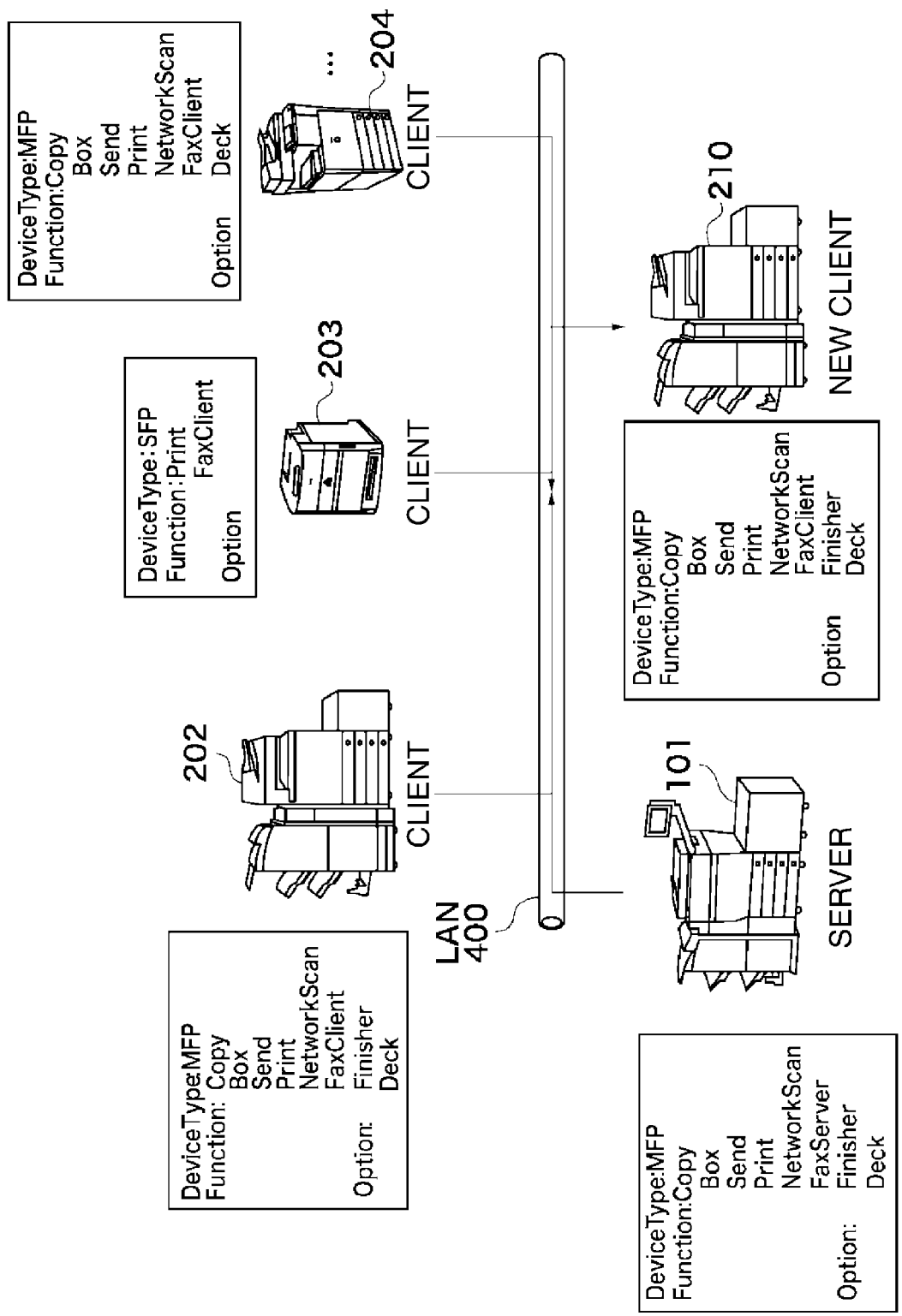
FIG. 18 is a view useful in explaining an exemplary arrangement of an image processing system according to a fourth embodiment of the present invention.

FIG. 18 is a view useful in explaining an exemplary arrangement of the image processing system according to the fourth embodiment of the present invention.

As shown in FIG. 18, it is assumed in the present embodiment that an image processing apparatus 101 as a server, an image processing apparatus 210 as a new client, and an image processing apparatus 202 as a client are MFPs having a finisher as an option. Also, it is assumed that an image processing apparatus 203 as a client is an SFP that does not have a finisher as an option, and an image processing apparatus 204 as a client is an MFP that does not have a finisher as an option.

Figure 19:
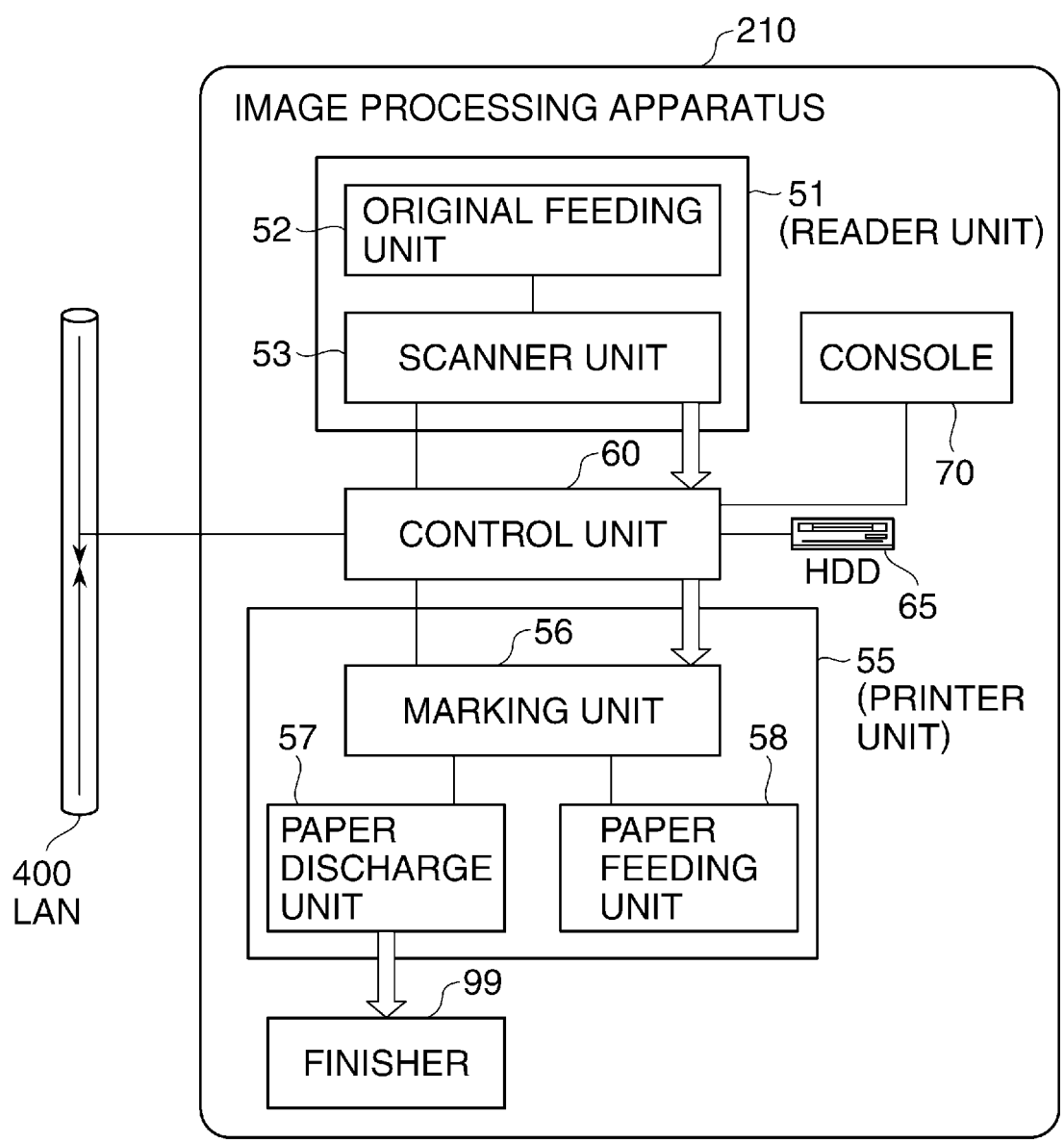
FIG. 19 is a block diagram useful in explaining a basic arrangement of an image processing apparatus (MFP) having a finisher as an option.

FIG. 19 is a block diagram useful in explaining a basic arrangement of an image processing apparatus (MFP) having a finisher as an option.

As shown in FIG. 19, a finisher 99 is connected to a discharge unit 57 of the image processing apparatus. A reader unit 51, a printer unit 55, a control unit 60, a console 70, and an HDD 65 are the same as those in the above described first embodiment (FIG. 3), and therefore, description thereof is omitted.

FIGS. 20A and 203 are diagrams showing exemplary common distribution values and unique distribution values. In FIGS. 20A and 20B, distribution values 712 of common distribution values 711 are the same as those in the above described first embodiment (FIG. 6A), but distribution values 713 are different from those in the above described first embodiment (FIGS. 6A and 6B). As distribution values 713, setting values required for a finisher option (discharge tray settings and copy specification settings) are written. Unique distribution values 714 are the same as those in the above described first embodiment (FIG. 6B).

Further, in the present embodiment, to determine a device as a distribution source based on provided functions, first, the image processing apparatus 101 refers to Option 303 of device information, and determines an image processing apparatus as a distribution source for distribution values from among a plurality of image processing apparatuses as clients.

It should be noted that when there are a plurality of image processing apparatuses having a finisher among the image processing apparatuses as clients, the image processing apparatus 101 refers to Devicetype 301 and Function 302 (see FIG. 2) as the remaining device information. Then, the image processing apparatus 101 determines that an image processing apparatus whose device information is closest to the image processing apparatus 210 is to be a distribution source for distribution values.

Figure 21A:
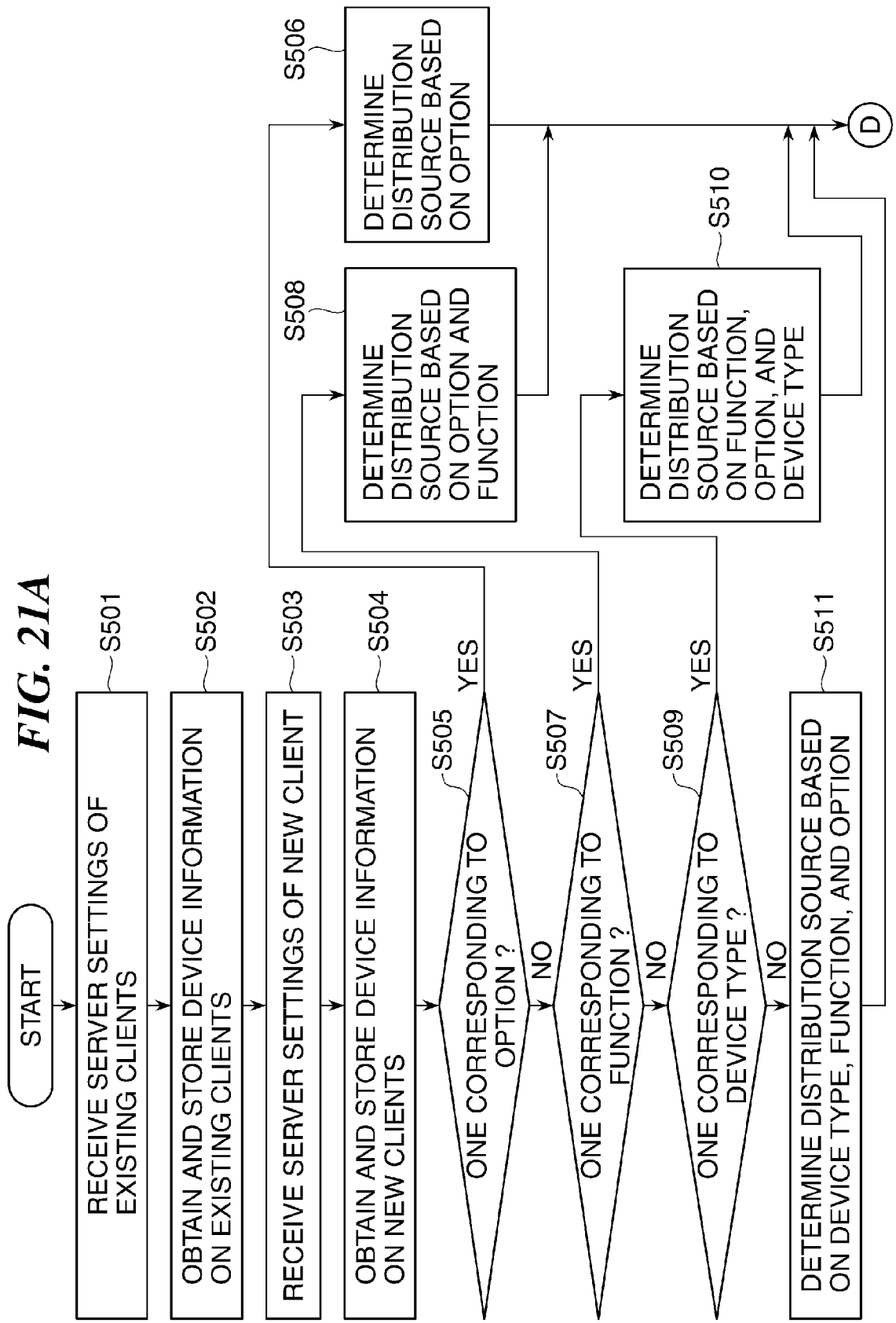
FIGS. 21A and 21B are flowcharts useful in explaining a distribution value distributing process carried out by an image processing apparatus as a server.
Figure 21B:
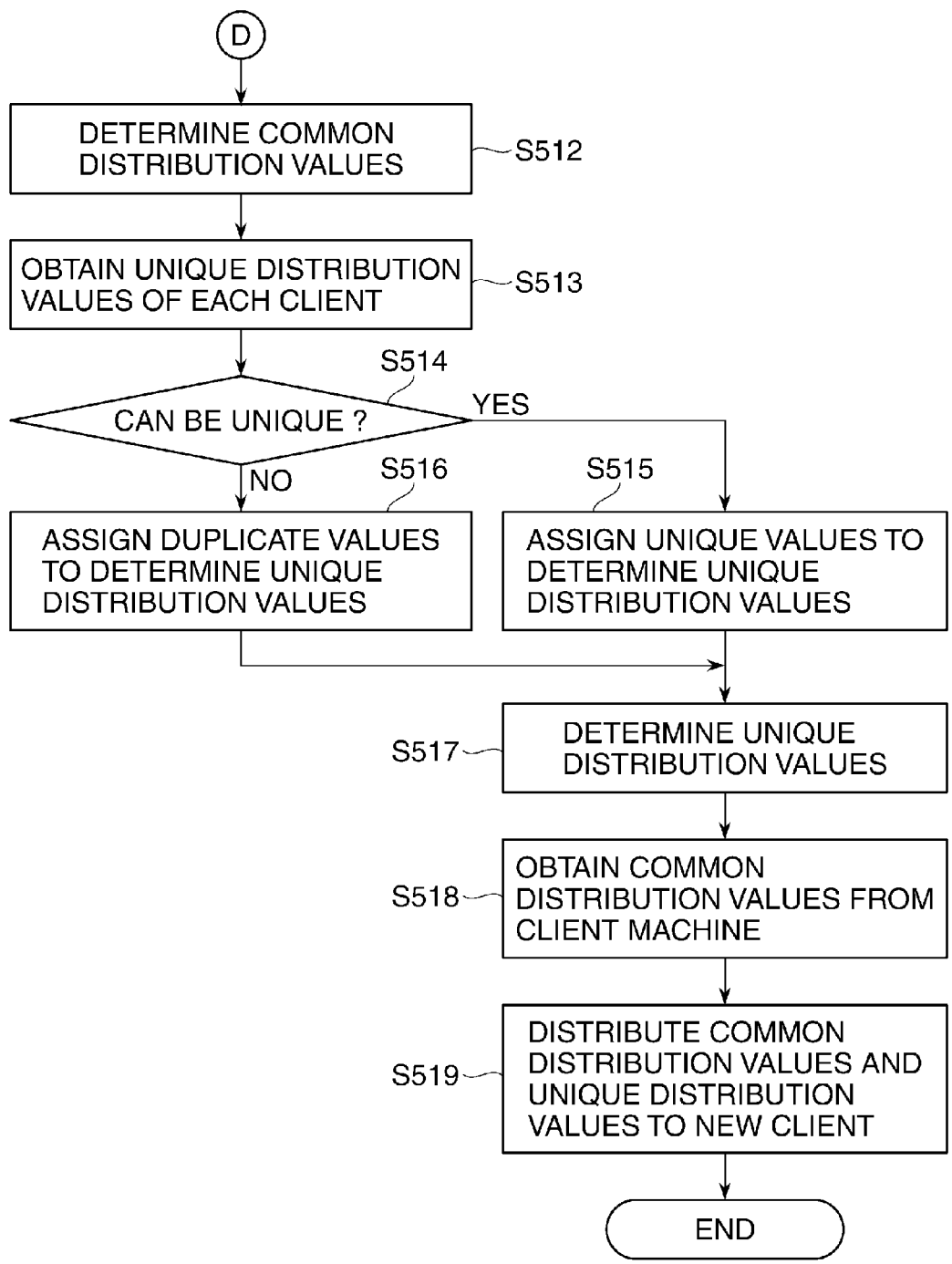

FIGS. 21A and 21B are flowcharts useful in explaining a distribution value distributing process carried out by the image processing apparatus 101 as a server. Each process in FIGS. 21A and 21B is executed by a CPU or the like of the control unit 60 in accordance with a control program stored in a ROM, the HDD 65, or the like of the image processing apparatus 101, which is loaded into a RAM.

Steps S501 to S504 and steps S511 to S519 in FIGS. 21A and 21B are the same as the steps S101 to S104 and the steps S111 to S119, respectively, in the above described first embodiment (FIGS. 8A and 8B), and therefore, description thereof is omitted.

In step S505, the control unit 60 checks Option 303 (FIG. 2) of the obtained device information. Specifically, the control unit 60 determines whether or not the number of options corresponding to an option of the image processing apparatus 210 among respective options of the image processing apparatuses 202, 203, and 204 is one.

When the number of options corresponding to the option of the image processing apparatus 210 is one, the control unit 60 proceeds to step S506, and when the number of options corresponding to the option of the image processing apparatus 210 is not one (i.e. plural), the control unit 60 proceeds to the step S507.

In the step S506, the control unit 60 determines a client image processing apparatus having device information including the option corresponding to the option of the image processing apparatus 210 as a distribution source for distribution values, and proceeds to step S312.

In the step S507, the control unit 60 checks Function 302 (see FIG. 2) of the obtained device information. Specifically, the control unit 60 determines whether or not the number of function information pieces corresponding to function information on the image processing apparatus 210 among respective pieces of function information on the image processing apparatuses 202, 203, and 204 is one.

When the number of function information pieces corresponding to the function information on the image processing apparatus 210 is one, the control unit 60 proceeds to step S508, and when the number of function information pieces corresponding to the function information on the image processing apparatus 210 is not one (i.e. plural), the control unit 60 proceeds to step S509.

In the step S508, the control unit 60 determines that a client image processing apparatus having device information including the function information corresponding to the function information on the image processing apparatus 210 is to be a distribution source for distribution values, and proceeds to the step S512.

In the step S509, the control unit 60 checks Devicetype 301 (see FIG. 2) of the obtained device information. Specifically, the control unit 60 determines whether or not the number of device types corresponding to the device type of the image processing apparatus 210 among respective device types of the image processing apparatuses 202, 203, and 204 is one.

When the number of device types corresponding to the device type of the image processing apparatus 210 is one, the control unit 60 proceeds to step S510, and when the number of device types corresponding to the device type of the image processing apparatus 210 is not one (i.e. plural), the control unit 60 proceeds to the step S511.

In the step S510, the control unit 60 determines that a client image processing apparatus having device information including the device type corresponding to the device type of the image processing apparatus 210 is to be a distribution source for distribution values, and proceeds to the step S512. Other arrangements and effects are the same as those in the above described first embodiment.

Next, a description will be given of an image processing system according to a fifth embodiment of the present invention with reference to FIGS. 22 to 24B.

Figure 22:
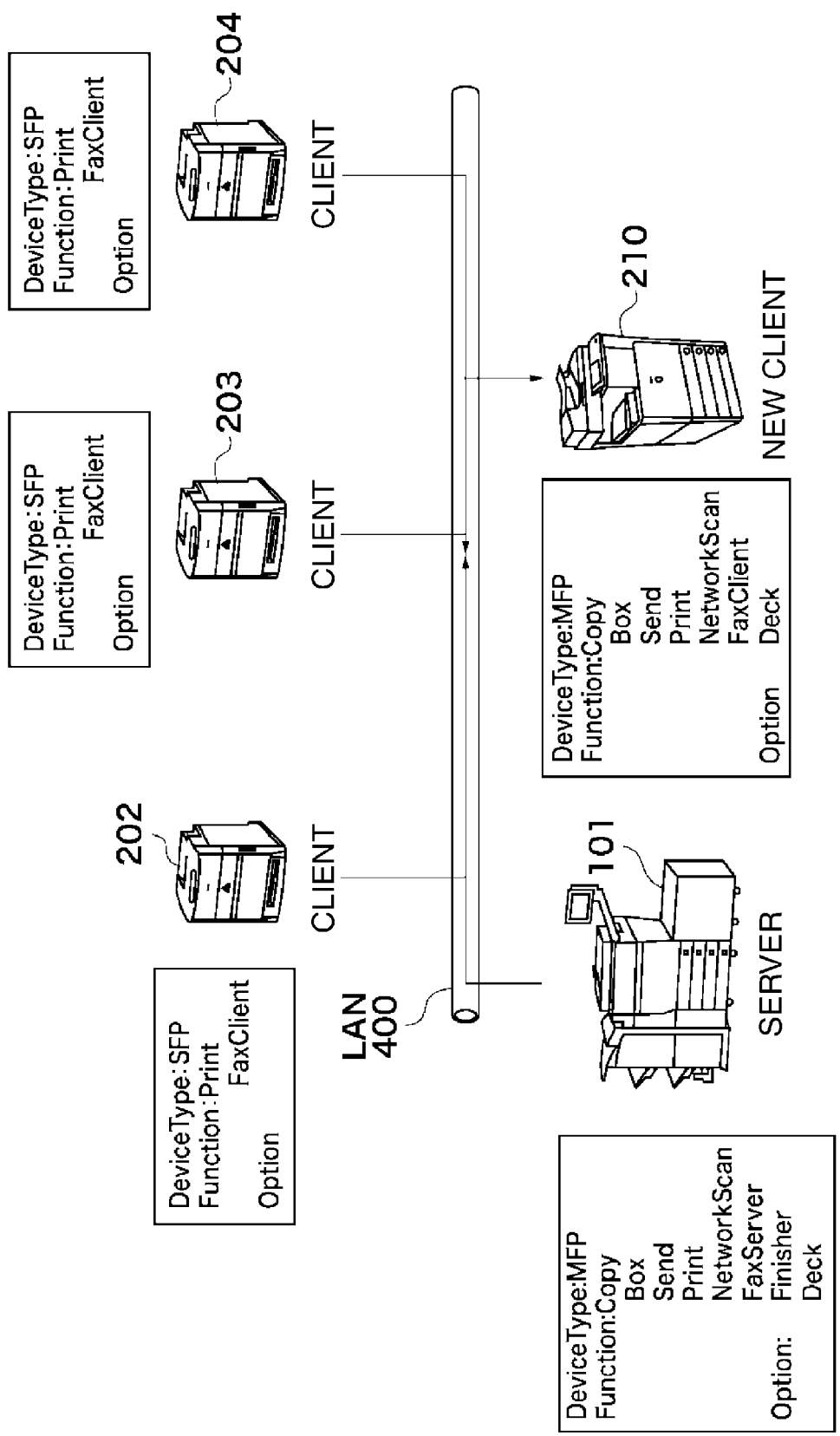
FIG. 22 is a view useful in explaining an exemplary arrangement of an image processing system according to a fifth embodiment of the present invention.

FIG. 22 is a view useful in explaining an exemplary arrangement of the image processing system according to the fifth embodiment of the present invention.

As shown in FIG. 22, it is assumed in the present embodiment that an image processing apparatus 101 as a server and an image processing apparatus 210 as a new client are MFPs, and image processing apparatuses 202, 203, and 204 as clients are SFPs.

Here, in the image processing apparatus 210 as the new client, print-associated settings and facsimile reception settings are suitably configured by copying distribution values from the image processing apparatuses 202, 203, and 204 as clients, but this is not enough. For example, distribution values for copying, box, and so on do not exist in the image processing apparatuses 202, 203, and 204 as clients which are SPFs. Thus, in the present embodiment, the image processing apparatus 210 as the new client combines distribution values from any of the image processing apparatuses 202, 203, and 204 as clients and distribution values from the image processing apparatus 101 as a server into setting values.

FIGS. 23A and 23B are diagrams showing exemplary common distribution values and unique distribution values. In FIGS. 23A and 23B, distribution values 712 of common distribution values 711 are the same as those in the above described first embodiment, but part of distribution values 713 are different from those in the above described first embodiment. Report output settings 721 of the distribution values 713 are values held by the client image processing apparatuses 202, 203, and 204 as well, but box settings 722 do not exist in the client image processing apparatuses 202, 203, and 204. Thus, distribution values in the image processing apparatus 101 as the server are used as the box settings 722. As unique distribution values 714 as well, distribution values in the image processing apparatus 101 as a server are used as a need arises.

Figure 24B:
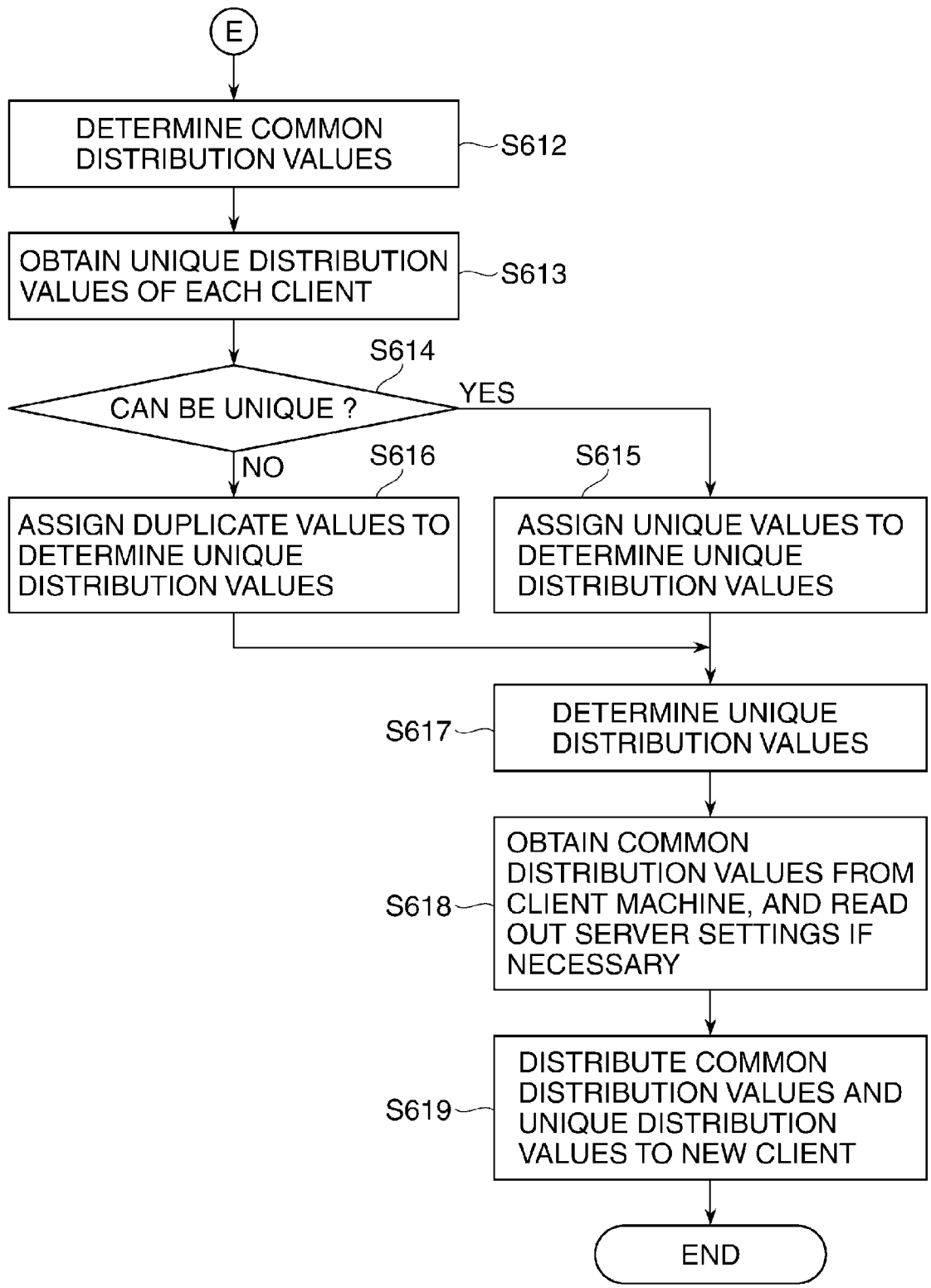

FIGS. 24A and 24B are flowcharts useful in explaining a distribution value distributing process carried out by the image processing apparatus 101 as the server. Each process in FIGS. 24A and 24B is executed by a CPU or the like of a control unit 60 in accordance with a control program stored in a ROM, an HDD 65, or the like of the image processing apparatus 101, which is loaded into a RAM.

Steps S601 to S604 are the same as the steps S101 to S104, respectively, in the above described first embodiment (FIG. 8A), and therefore, description thereof is omitted. Also, steps S605 to S617 and step S619 are the same as the steps S105 to S117 and the step S119, respectively, in the above described first embodiment (FIGS. 8A and 83), and therefore, description thereof is omitted.

In step S604a, the control unit 60 determines whether or not any of respective device types in the device information of the image processing apparatuses 202, 203, and 204 obtained in the step S604 corresponds to the device type of the image processing apparatus 210.

For example, functions of MFPs and SFPs defined by their device types vary greatly. For this reason, when any of respective device types in the device information of the client image processing apparatuses 202, 203, and 204 does not correspond to the device type of the image processing apparatus 210, distribution values must be constructed such as to include device information on the image processing apparatus 101 as a server.

Thus, when any of respective device types in the device information of the image processing apparatuses 202, 203, and 204 corresponds to the device type of the image processing apparatus 210, the control unit 60 proceeds to the step S605, and carries out the same process as in the above described first embodiment.

On the other hand, when any of respective device types in the device information of the mage processing apparatuses 202, 203, and 204 does not correspond to the device type of the image processing apparatus 210, the control unit 60 proceeds to step S604b.

In the step S604b, the control unit 60 determines whether or not all setting values of Function held by the image processing apparatus 210 as the new client can be comprised of distribution values held by the plurality of image processing apparatuses.

When all setting values of Function held by the image processing apparatus 210 as the new client can be comprised of distribution values held by a plurality of image processing apparatuses, the control unit 60 proceeds to step S604c, and when not, the control unit 60 proceeds to step S604d.

In the step S604c, the control unit 60 determines that a plurality of image processing apparatuses are to be distribution sources for distribution values, and proceeds to the step S612.

On the other hand, in the step S604d, the control unit 60 determines that a plurality of image processing apparatuses that can partly construct setting values of Function held by the image processing apparatus 210 as the new client are to be distribution sources for distribution values, and proceeds to the step S612.

Moreover, in step S618, the control unit 60 obtains common distribution values of the image processing apparatus 101 when obtaining common distribution values from the image processing apparatuses as the clients, and proceeds to step S619. Other arrangements and effects are the same as those in the above described first embodiment.

It should be noted that the present invention is not limited to the embodiments shown above, but various changes may be made without departing from the scope of the invention. Although in the above described embodiments, MFPs and SFPs are taken as examples of the image processing apparatuses, the image processing apparatuses may be scanner units, facsimile machines, personal computers, or mobile information equipment such as cellular phones. Moreover, although in the above described embodiments, information such as Devicetype, Function, and Option is used as criteria for determining an image processing apparatus close to an image processing apparatus on which attention is being focused, other information may be used. For example, a vender ID indicative of a manufacturer of an image processing apparatus, a machine name, a model name, and so on may be used as criteria for determination. Alternatively, for example, a user ID indicative of information identifying a user who uses an image processing apparatus may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001856 filed Jan. 7, 2009, which is hereby incorporated by reference herein in its entirety.

What is claimed is:

1. An image processing system in which a plurality of image processing apparatuses are connected together for communication with each other, comprising:
   a first obtaining unit adapted to obtain device information for each of a plurality of first image processing apparatuses that are already connected to the system;
   a second obtaining unit adapted to obtain device information for a second image processing apparatus that is newly connected to the system;
   a third obtaining unit adapted to obtain unique distribution values from the plurality of first image processing apparatuses; and
   a control unit adapted to select an image processing apparatus that is to distribute common distribution values to the second image processing apparatus from among the plurality of first image processing apparatuses based on an analysis, performed by the control unit, of the device information obtained by said first obtaining unit and said second obtaining unit, and adapted to determine unique distribution values to be distributed to the second image processing apparatus based on the unique distribution values obtained by said third obtaining unit.

2. An image processing apparatus comprising:
   a first obtaining unit adapted to obtain device information for each of a plurality of first image processing apparatuses that are already connected to a network;
   a second obtaining unit adapted to obtain device information for a second image processing apparatus that is newly connected to the network;
   a third obtaining unit adapted to obtain unique distribution values from the plurality of first image processing apparatuses; and
   a control unit adapted to select an image processing apparatus that is to be a distribution source that distributes common distribution values to the second image processing apparatus from among the plurality of first image processing apparatuses based on an analysis, performed by the control unit, of the device information obtained by said first obtaining unit and said second obtaining unit, and adapted to determine unique distribution values to be distributed to the second image processing apparatus based on the unique distribution values obtained by said third obtaining unit.

3. An image processing apparatus according to claim 2, wherein said control unit obtains the common distribution values from the image processing apparatus as the distribution source, and distributes the common distribution values to the second image processing apparatus.

4. An image processing apparatus according to claim 2, wherein said control unit instructs the image processing apparatus as the distribution source to distribute the common distribution values to the second image processing apparatus.

5. An image processing apparatus according to claim 2, wherein said control unit determines that the unique distribution values to be distributed to the second image processing apparatus are unique values, and distributes the determined unique distribution values to the second image processing apparatus.

6. An image processing apparatus according to claim 2, wherein in selecting the image processing apparatus that is to be the distribution source for the common distribution values, said control unit determines that a plurality of image processing apparatuses are to be the distribution source.

7. An image processing apparatus according to claim 6, wherein said control unit distributes common distribution values of the image processing apparatus itself and the common distribution values in combination to the second image processing apparatus.

8. A control method for an image processing apparatus comprising:
   a first obtaining step of obtaining device information for each of a plurality of first image processing apparatuses that are already connected to a network;
   a second obtaining step of obtaining device information for a second image processing apparatus that is newly connected to the network;
   a third obtaining step of obtaining unique distribution values from the plurality of first image processing apparatuses; and
   a control step of selecting a selected image processing apparatus that is to distribute common distribution values to the second image processing apparatus from among the plurality of first image processing apparatuses, the selecting based on an analysis, performed by a control unit of the image processing apparatus, of the device information obtained in said first obtaining step and said second obtaining step, and determining unique distribution values to be distributed to the second image processing apparatus based on the unique distribution values obtained in said third obtaining step.

9. A non-transitory computer-readable storage medium storing a control program for an image processing apparatus, the control program comprising:
   first obtaining instructions configured to obtain device information for each of a plurality of first image processing apparatuses that are already connected to a network;
   second obtaining instructions configured to obtain device information for a second image processing apparatus that is newly connected to the network;

third obtaining instructions configured to obtain unique distribution values from the plurality of first image processing apparatuses; and control instructions configured to select a selected image processing apparatus that is to distribute common distribution values to the second image processing apparatus from among the plurality of first image processing apparatuses, the selection based on an analysis, performed by a control unit of the image processing apparatus, based on the device information obtained according to said first obtaining instructions and said second obtaining instructions and configured to determine unique distribution values to be distributed to the second image processing apparatus based on the unique distribution values obtained according to said third obtaining instructions.

10. An image processing apparatus according to claim 2, wherein the device information obtained by said first obtaining unit and said second obtaining unit includes device type information of each of the respective image processing apparatuses.

11. An image processing apparatus according to claim 2, wherein the device information obtained by said first obtaining unit and said second obtaining unit includes function information of each of the respective image processing apparatuses.

12. An image processing apparatus according to claim 2, wherein the device information obtained by said first obtaining unit and said second obtaining unit includes option information of each of the respective image processing apparatuses.

* * * * *